United States Patent
Le Saint et al.

(10) Patent No.: US 12,200,113 B2
(45) Date of Patent: *Jan. 14, 2025

(54) CONSENSUS-BASED ONLINE AUTHENTICATION

(71) Applicant: Visa International Service Association, San Francisco, CA (US)

(72) Inventors: Eric Le Saint, Los Altos, CA (US); Subramanian Kumaraswamy, Cupertino, CA (US)

(73) Assignee: Visa International Service Association, San Francisco, CA (US)

(*) Notice: Subject to any disclaimer, the term of this patent is extended or adjusted under 35 U.S.C. 154(b) by 120 days.

This patent is subject to a terminal disclaimer.

(21) Appl. No.: 17/956,584

(22) Filed: Sep. 29, 2022

(65) Prior Publication Data
US 2023/0033988 A1 Feb. 2, 2023

Related U.S. Application Data

(63) Continuation of application No. 16/977,757, filed as application No. PCT/US2018/025089 on Mar. 29, 2018, now Pat. No. 11,522,687.

(51) Int. Cl.
*H04L 9/08* (2006.01)
*H04L 9/32* (2006.01)
(Continued)

(52) U.S. Cl.
CPC ............ *H04L 9/085* (2013.01); *H04L 9/3263* (2013.01); *H04L 63/1433* (2013.01); *H04L 2209/46* (2013.01); *H04W 12/63* (2021.01)

(58) Field of Classification Search
CPC ... H04L 9/085; H04L 9/3263; H04L 63/1433; H04L 2209/46; H04W 12/63
See application file for complete search history.

(56) References Cited

U.S. PATENT DOCUMENTS 8,301,883 B2 * 10/2012 Sundaram ............. H04L 9/0825
380/278
8,904,195 B1 12/2014 Rahat et al.
(Continued)

FOREIGN PATENT DOCUMENTS

CN 101297534 A 10/2008
CN 108352015 A 7/2018
(Continued)

OTHER PUBLICATIONS

Application No. SG11202009317S, Further Written Opinion, Mailed On Dec. 19, 2023, 7 pages.
(Continued)

*Primary Examiner* — Samson B Lemma
*Assistant Examiner* — Alex D Carrasquillo
(74) *Attorney, Agent, or Firm* — Kilpatrick Townsend & Stockton LLP

(57) ABSTRACT

Methods and systems for consensus-based online authentication are provided. An encryption device may be authenticated based on an authentication cryptogram generated by the encryption device. The encryption device may transmit a request for security assessment to one or more support devices. The support devices may individually assess the encryption device, other security devices, and contextual information. The support devices may choose to participate in a multi-party computation with the encryption device based on the security assessments. Support devices that choose to participate may transmit one or more secret shares or partial computations to the encryption device. The encryption device may use the secret shares or partial computations to generate an authentication cryptogram. The authentication cryptogram may be transmitted to a decryption device, which may decrypt the authentication crypto- (Continued)

gram, evaluate its contents, and authenticate the encryption device based on its contents.

19 Claims, 12 Drawing Sheets

(51) Int. Cl.
  *H04L 9/40* (2022.01)
  *H04W 12/63* (2021.01)

(56) References Cited

U.S. PATENT DOCUMENTS

| | | | | |
|---|---|---|---|---|
| 9,577,829 | B1* | 2/2017 | Roth | G06F 21/60 |
| 9,960,919 | B2* | 5/2018 | Lindell | H04L 9/3226 |
| 10,491,384 | B2* | 11/2019 | French | H04L 9/0861 |
| 11,063,941 | B2* | 7/2021 | Teranishi | H04L 63/0876 |
| 11,784,826 | B2* | 10/2023 | Sinha | H04L 9/088 |
| | | | | 713/176 |
| 2012/0137132 | A1 | 5/2012 | Le Saint | |
| 2014/0201809 | A1 | 7/2014 | Choyi et al. | |
| 2016/0065370 | A1* | 3/2016 | Le Saint | H04L 9/0891 |
| | | | | 713/155 |
| 2016/0292676 | A1 | 10/2016 | French et al. | |
| 2016/0294550 | A1 | 10/2016 | French et al. | |
| 2017/0272253 | A1* | 9/2017 | Lavender | H04L 63/12 |
| 2019/0116180 | A1 | 4/2019 | Teranishi et al. | |

FOREIGN PATENT DOCUMENTS

| | | |
|---|---|---|
| WO | 2014011997 A1 | 1/2014 |
| WO | 2016105553 A1 | 6/2016 |
| WO | 2017173099 A1 | 10/2017 |
| WO | 2017/195886 A1 | 11/2017 |

OTHER PUBLICATIONS

Application No. EP18912172.6, Extended European Search Report, Mailed On Mar. 2, 2021, 8 pages.
Application No. KR1020207030344, Office Action, Mailed On Jul. 16, 2022, 8 pages.
Application No. PCT/US2018/025089, International Search Report and Written Opinion, Mailed On Jan. 3, 2019, 12 pages.
Application No. SG11202009317S, Written Opinion, Mailed On Jul. 17, 2022, 9 pages.
Examination Report issued Sep. 30, 2022 for related EP application No. 18912172.6, 8 pages.
Application No. CN201880091489.4, Office Action, Mailed On Jul. 18, 2023, 20 pages.
EP18912172.6, "Intention to Grant", Jun. 22, 2023, 8 pages.
Application No. KR10-2020-7030344, Notice of Decision to Grant, Mailed On Jun. 20, 2023, with partial English Translation, 3 pages.
Microsoft Corporation, "The Coco Framework Technical Overview," Aug. 10, 2017, located at https://github.com/Azure/coco-framework/blob/master/docs/Coco%20Framework%20whitepaper.pdf, 27 pages.
Global Platform Inc., "Opacity Secure Channel; Card Specification v2.3—Amendment G, Version 1.0," Oct. 2016, 50 pages.
Application No. KR10-2023-7032128, Office Action, Mailed On Oct. 30, 2024, with English Summary, 4 pages.

* cited by examiner

CONSENSUS-BASED ONLINE AUTHENTICATION

CROSS-REFERENCE TO RELATED APPLICATIONS

This application is a continuation of U.S. patent application Ser. No. 16/977,757, filed Sep. 2, 2020, which is a 371 National Stage of International Application No. PCT/US2018/025089, filed Mar. 29, 2018, the disclosures of which are incorporated by reference herein in their entireties.

BACKGROUND

Authentication is a commonly used technique for improving the security of online applications. As an example, when a user attempts to access their email over a web-based email client, the web server usually challenges the user to provide a username and password to authenticate the user before they are given access to a protected or sensitive resource.

Some online services go a step farther and use "two-factor" authentication, where the user is required to provide several pieces of evidence as part of the authentication process. As an example, mobile phone two-factor authentication can involve a user providing a password as well as a short code sent by SMS to their mobile phone.

Fraudsters often exploit these methods in order to fraudulently authenticate. Passwords are often stolen, and many consumer electronic devices can either be hacked or stolen in order to trick two-factor authentication methods. Fraudulent authentication is a key component of cybersecurity threats. Further, advanced authentication methods are typically annoying to users, as they have to remember or be able to provide more information than under less secure authentication methods. As an example, if a user has lost their mobile phone, they can no longer perform two factor authentication.

Thus, there is a need for new, secure, and convenient methods of online authentication.

SUMMARY

Embodiments are directed towards methods and systems of authenticating an encryption device. Some of these embodiments may be referred to as "consensus-based online authentication."

To generate an authentication cryptogram used to authenticate the encryption device, an encryption device may request a security assessment from one or more support devices. The one or more support devices may perform the security assessment, and some of the one or more support devices may participate in a multi-party computation with the encryption device. The multi-party computation may result in an authentication cryptogram. The authentication cryptogram may be transmitted from the encryption device to a decryption device. The decryption device may decrypt and evaluate the authentication cryptogram. The decryption device may authenticate the encryption device based on the evaluation.

One embodiment is directed to a method for participating in a generation of a cryptogram, the method including performing at a support device: receiving a request for security assessment, wherein the request is for the support device to participate in a multi-party computation to generate a cryptogram, and wherein the support device stores one or more secret shares generated from one or more secret values; receiving security data; identifying one or more security properties from the security data, the one or more security properties corresponding to a current state of a device providing the security data; comparing the one or more security properties to reference accessible to the support device; deciding whether to participate in the multi-party computation based on the comparing of the one or more security properties to the reference data; and when the support device decides to participate, providing a partial cryptographic value to one or more encryption engines, wherein the partial cryptographic value is configured to be used by the one or more encryption engines to generate the cryptogram via the multi-party computation, and wherein the partial cryptographic value includes the one or more secret shares, at least one partial computation using at least one of the one or more secret shares, or a combination thereof.

Another embodiment is directed to a method for generating a cryptogram, the method including performing at an encryption device: transmitting a request for a security assessment to one or more support devices, wherein the request is for the one or more support devices to participate in a multi-party computation to generate a cryptogram, wherein the one or more support devices store one or more secret shares generated from one or more secret values; transmitting security data to the one or more support devices; receiving a partial cryptographic value from at least a portion of the one or more support devices, wherein the partial cryptographic value includes at least one of the one or more secret shares, at least one partial computation using at least one of the one or more secret shares or a combination thereof; and generating the cryptogram using a plurality of partial cryptographic values obtained from at least two of the one or more support devices and the encryption device.

Another embodiment is directed to a method of decrypting a cryptogram, the method including performing at the decryption system: storing a plurality of secrets across one or more decryption devices of the decryption system, wherein the plurality of secrets are also stored by an encryption system, wherein each of the plurality of secrets are stored by the decryption system in association with a different assurance level, wherein a first assurance level is higher than a second assurance level when encryption devices of the encryption system contribute more secret shares for the first assurance level than for the second assurance level; receiving a cryptogram from the encryption system; selecting a first secret of the plurality of secrets to use to decrypt the cryptogram, wherein the first secret corresponds to the first assurance level; determining that the first secret was used to encrypt the cryptogram; decrypting the cryptogram using the first secret to obtain confidential information; and based on the first assurance level, processing the confidential information according to a first protocol.

These and other embodiments are described in detail below. For example, other embodiments are directed to systems, devices, and computer readable media associated with methods described herein.

A better understanding of the nature and advantages of embodiments may be gained with reference to the following detailed description and the accompanying drawings.

Prior to discussing specific embodiments, some terms may be described in detail.

TERMS

A "server computer" may include a powerful computer or cluster of computers. For example, the server computer can be a large mainframe, a minicomputer cluster, or a group of servers functioning as a unit. In one example, the server computer may be a database server coupled to a web server. The server computer may include one or more computational apparatuses and may use any of a variety of computing structures, arrangements, and compilations for servicing the requests from one or more client computers.

A "memory" may be any suitable device or devices that may store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

A "processor" may refer to any suitable data computation device or devices. A processor may include one or more microprocessors working together to accomplish a desired function. The processor may include a CPU that includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may refer to something used in encryption or decryption. A cryptographic key could, for example, refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "plaintext" may refer to text that is in a plain form. For example, this may refer to text that is readable by a human or a computer without any processing, such as the phrase "hello, how are you?" It may also refer to text that is in an unencrypted form. Numbers or other symbols may also qualify as plaintext.

The term "ciphertext" may refer to text that is in an encrypted form. For example, this could refer to text that must be decrypted before it is readable by a human or computer. Ciphertext may be generated by any number of cryptographic algorithms or cryptosystems, such as RSA or AES.

A "cryptographic device" may refer to any device that may perform cryptographic operations, including encryption and decryption. Examples of cryptographic devices include desktop computers, laptops, servers, smartphones, smart watches, tablets, videogame consoles or other portable electronic devices. A cryptographic device may perform cryptographic operations by executing an application. An "encryption device" and a "decryption device" are both examples of cryptographic devices. A cryptographic device may possess a "secret," or "secret share."

A "support device" may refer to any device that may assist a cryptographic device in performing cryptographic operations and may possess one or more secret shares. As an example, a support device may assist an encryption device by providing a secret or secret share to the encryption device. A support device may be a cryptographic device. A support device may also perform security assessments of other cryptographic devices, including other support devices.

The term "multi-party computation" may refer to a computation that is performed by multiple parties. Each party, such as a server or computer, may have some inputs to the computation. For example, one party might know the length of one side of a rectangle and another party may know the length of another side. The two parties could perform a multi-party computation to determine the area of the rectangle.

The term "secure multi-party computation" may refer to a multi-party computation that is secure. In many cases, this refers to a multi-party computation in which the parties do not share information or other inputs with one another. As an example, two parties may wish to know which one of them is wealthier, without revealing their wealth to each other. The two parties could use a secure multi-party computation technique, such as garbled circuits in order to accomplish this.

A "secret" may refer to a value or thing kept hidden as part of a cryptographic process. The security of the cryptographic process may rely on the secret only being known to only a few parties. For example, a secret may be a cryptographic key. Exposure of the secret may allow parties other than the intended parties to encrypt or decrypt messages.

A "shared secret" may refer to a secret value or thing shared between multiple parties. For example, a shared secret may be a cryptographic key, divided up such that multiple parties each possess a fraction of that cryptographic key. For instance, a 128 bit cryptographic key may be divided among 8 parties, such that each party holds 16 bits of the cryptographic key.

A "secret share" may refer to a value derived from a shared secret. As an example, a secret share may be the first 12 bits of a secret value. A secret share may also be a secret value binary exclusive-OR with a number. A secret share may in some instances be combined with a number of other secret shares in order to reproduce a secret.

A "hash function" may refer to any function that can be used to map data of arbitrary size to data of fixed size. Hash functions may be used to perform rapid data lookup. They may also be used to hide or obscure data by replacing it with its corresponding "hash value." For example, a long message may be converted using a hashing algorithm to a 256-bit sequence. If the hashing function is "collision resistant," meaning that it is difficult to find two messages that hash out to the same value, a hashing algorithm can be used to create a "commitment message," a message that may be used to verify that an encrypted message has not been tampered with.

A "commitment message" may refer to a message that may be used to verify that a course of action has been committed to. In a cryptographic context, a commitment message may refer to a message that may be used to verify that an encrypted message was not tampered with. Before a message is encrypted, a commitment message can be produced based on the message, e.g., via a hash function. This commitment message can be sent alongside the encrypted message. Once the message is decrypted, the recipient can generate its own commitment message in the same manner. The received commitment message and the generated commitment message can be compared to verify a match.

A "pseudorandom function" may refer to a deterministic function that produces an output that appears random. Pseudorandom functions may include hash functions, especially collision resistant hash functions, as well as elliptic curve groups. A pseudorandom function may approximate a random oracle, an ideal cryptographic primitive that maps an input to a random output from its output domain. A pseudorandom function can be constructed from a pseudorandom number generator.

A "random nonce" or "cryptographic nonce" may refer to an arbitrary number that may only be used a limited number of times. A random nonce may be randomly or pseudo-randomly generated, and may be used in a cryptographic hash function. A random nonce may prevent some forms of cryptographic attack, such as "replay attack."

The term "security data" may refer to a packet or message containing one or more "security properties," measurable aspects that may be used to infer the security of a device or system. Security data may be in an encrypted or compressed form, and may need to be specially interpreted in order to extract the security properties. Examples of security properties include application signature, laptop device configuration and fingerprints, user identity and authentication status, anti-malware protection status, laptop location, local time, and usage data, among others.

The term "assurance level" may refer to a measure or indication of how much confidence an entity has regarding something. For example, an assurance level may correspond to how confident an encryption system is that a cryptogram was not generated for fraudulent purposes. Assurance levels may correspond to secrets. A secret corresponding to a high assurance level may require more secret shares to reproduce than a secret corresponding to a low assurance level.

DETAILED DESCRIPTION

Embodiments can improve the security of online authentication by providing for methods of generating authentication cryptograms. An encryption device along with a collection of support devices can work together to generate an authentication cryptogram that may be used to authenticate a user associated with the encryption device. Support devices can decide whether or not to participate in the cryptogram generation, some support devices may not participate. Further, some support devices may participate more than other support devices. This cryptogram may be sent to a decryption device that may decrypt the cryptogram, evaluate its contents, and authenticate the user. This authentication cryptogram can be difficult for a fraudster to create on their own, given the active collaboration among devices. As such, a fraudster cannot falsely authenticate and gain access to protected information. Thus, embodiments can provide an improvement over traditional authentication methods that are vulnerable to fraudulent use.

The following sections describe methods and systems used to perform consensus based online authentication in greater detail. Section I introduces embodiments in terms of current problems in authentication security. Section II provides an overview of consensus authentication and encryption. Section III describes a system that performs consensus-based online authentication according to some embodiments. Section IV describes a method of consensus-based online authentication. Section V discusses a security assessment procedure performed by support devices. Section VI describes a multi-party computation used to generate authentication cryptograms. Section VII describes an authentication process performed by a decryption device. Section VIII describes some additional device configurations, and section IX describes a computer system according to some embodiments.

I. Introduction

Authentication is increasingly common in many web-based client server interactions. Internet users frequently authenticate when accessing a web-based email client, shopping online, or communicating with their healthcare provider. Most of the time, authentication simply involves a user entering a username and password and a server authenticating the user by verifying that the information is correct.

Figure 1A:
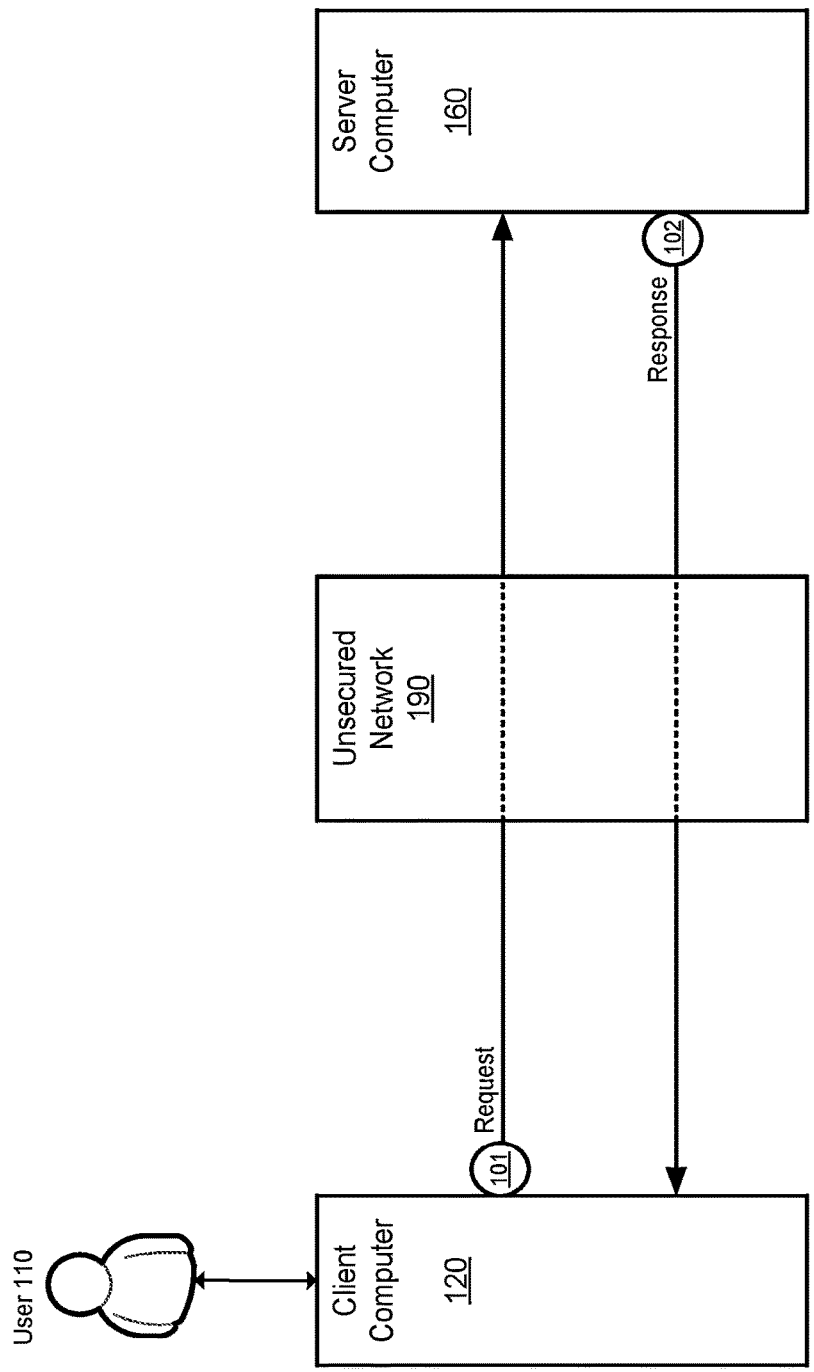
FIG. 1A shows a simplified message flow diagram illustrating communication between a client computer and a server computer according to some embodiments.

FIG. 1A shows a block diagram of a client and server interaction via an unsecured network. A client computer 120 associated with a user 110 transmits a request 101 via an unsecured network 190 (such as the Internet) to a server computer 160. The server computer 160 can generate and transmit a response 102 to the client computer 120. This model can describe many online interactions.

As an example, the user 110 operating a client computer 120 such as a laptop may transmit a request 101 to access their web-based email account to a server computer 160 operating as an email server. The request 101 may contain information used to perform authentication, such as a username and password. The request 101 can be transmitted in encrypted form through the unsecured network 190 and can be received by the server computer 160.

The server computer 160 can process the request 101 and generate a response 102. For example, if the username and password information is correct, the server computer 160 can authenticate the user 110, and the response 102 can be the email data the user 110 requested. If the information is incorrect, the response can be a message to that effect. The response 102 is preferably encrypted and transmitted through the unsecure network 190 to the client computer 120.

A number of security problems exist with this model. One such problem is the server computer 160 is blind to the user 110. Provided the server computer 160 receives credentials required to authenticate, the server computer 160 cannot actually know whether the user 110 is a rightful user or a fraudster that has acquired the user's 110 credentials. Fraudsters frequently acquire usernames and passwords and use them to steal private information in spite of the authentication system in place.

Another problem with the conventional model is that the server computer 160 does not consider the security of the client computer 120 during the interaction. In some cases, the client computer 120 may be compromised or remotely controlled by a hacker. In this case, the user 110 is uninvolved and unaware that the client computer 120 is being used to send requests 101 to the server computer 160. The hacker can use passwords or other information stored on the client computer 120 in order to send requests 101 (such as authentication requests) and receive responses 102 (such as private information). The responses 102 can be forwarded from the client computer 120 to the hacker without the user's 110 knowledge.

In conventional systems, no security assessment is performed to verify that the user 110 is who they say they are or to verify the security of the client computer 120. However, embodiments allow for a user security assessment and a device security assessment. The user security assessment accurately verifies that the user 110 is a legitimate user, and the device security assessment verifies that the client computer 120 is in a secure and healthy state. These security assessments greatly improve the authentication process and prevent false authentication and illegal data access.

II. Consensus Authentication and Encryption

Figure 1B:
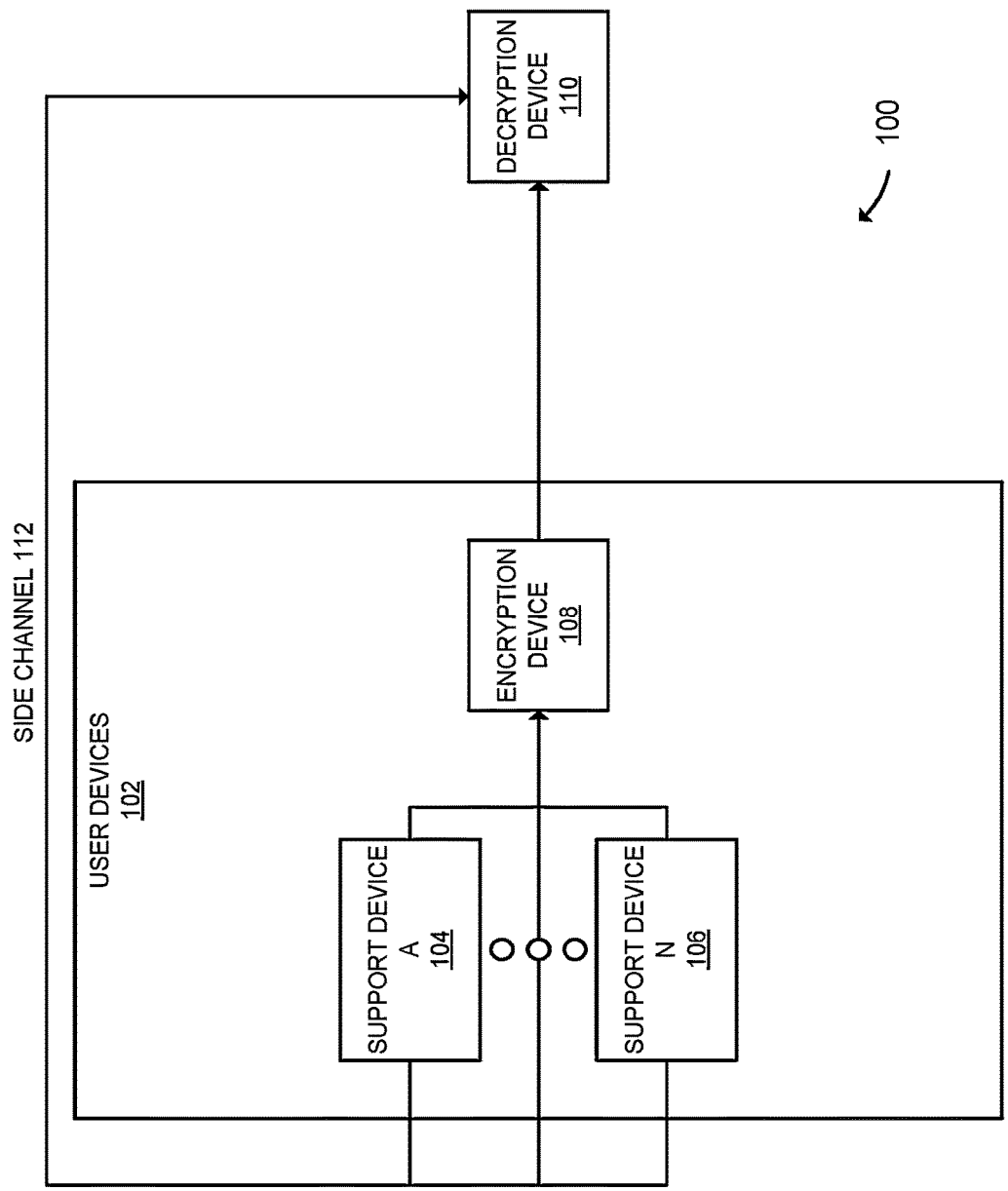
FIG. 1B shows a block diagram of a system according to some embodiments.

The system and methods used to perform consensus-based online authentication can be better understood with reference to FIG. 1B. This figure will also be discussed in greater detail in section III.

FIG. 1B shows a block diagram of a system 100 used to perform consensus-based online authentication, including a collection of user devices 102 including a number of support devices 104-106 and an encryption device 108. Additionally shown are a decryption device 110 and a side channel 112.

The user devices 102 are a collection of devices owned by a user. These devices (i.e., the encryption device 108 and support devices 104-106) may include electronic devices such as laptops, desktop computers, smart phones, smart watches, smart cars, videogame consoles, etc. The decryption device 110 can be a computer or server computer capable of decrypting messages. These devices may communicate with one another over a network such as the Internet. They may also communicate with one another via other means, such as Bluetooth or Wi-Fi. These devices may operate special software or applications that enable cryptographic operations.

The support devices 104-106 and the encryption device 108 may also have "secret shares" stored in their memory. These secret shares can be derived from a "shared secret" or "secret," a value used in cryptographic operations. These secret shares can be used by the support devices 104-106 and the encryption device in generating the authentication cryptogram, and are discussed in greater detail in section III.

Generally speaking, embodiments can involve the encryption device 108 generating an authentication cryptogram with the help of support devices 104-106. The encryption device 108 transmits this authentication cryptogram to the decryption device 110. The decryption device 110 decrypts the authentication cryptogram and evaluates it. The decryption device 110 can authenticate the encryption device 108 based on the evaluation. For example, the decryption device 110 could be a web-based email server and could authenticate the encryption device 108, allowing a user to use the encryption device 108 to check their email.

As an example, a user may be operating their tablet computer (in this case, the encryption device 108), and may navigate via a web-browser to their web-based email client. Rather than inputting their username and password, the tablet can generate an authentication cryptogram and transmit it to the email server (the decryption device 110).

The tablet transmits a request for security assessment to support devices 104-106. This could include the user's smartwatch on their wrist, their smartphone in the other room, and the videogame console hooked up to their television. The tablet may transmit this request via a local network (such as the user's home Wi-Fi network), via the Internet, or some other appropriate means.

The support devices 104-106 can perform both a user security assessment and a device security assessment, and can transmit information to one another in order to help the other support devices perform the security assessment. As an example, the user may have unlocked the tablet (encryption device 108) using a biometric such as a thumb print. The tablet can send a timestamp and that biometric or biometric template to the support devices 104-106. This information can be used by the support devices 104-106 as part of the user security assessment. The smart watch (support device) can verify that the biometric template matches a template stored on, or accessible to the smart watch, indicating that it was the user that unlocked the tablet. As another example, the smart watch can be tracking heartbeat information from the user's wrist. The smart watch could send that heartbeat information to the other support devices.

Each support device 104-106 can individually evaluate the data and determine the security state of the user. As an example, the user's smartphone may determine that the user is with the smart watch (indicated by the recent heartbeat data) and was with the tablet very recently. Additionally, the data shows that the smart watch is near the tablet, and thus it is highly probable that the user is operating the tablet. The smart phone is assured that the user is operating the tablet and thus a cryptogram is being generated for a legitimate purpose.

Each support device 104-106 can also individually perform a device security assessment. This device security assessment evaluates whether the user devices 102 are in a secure state. For example, the videogame console could receive security state data from the tablet. The security state data may indicate that the tablet is running a secure operating system with an active firewall and anti-virus. The videogame console is assured that the tablet is not compromised by a hacker, and thus a cryptogram is being generated for a legitimate purpose.

Based on their individual security assessments, each support device 104-106 decides whether to participate in a multi-party computation with the encryption device 108. Support devices that are assured that the cryptogram is not being generated by a fraudster may decide to participate, while support devices that aren't so assured may decide not to participate. The multi-party computation results in the generation of an authentication cryptogram.

The multi-party computation involves each participating support device 104-106 generating "partial computations" based on secret shares. The tablet (encryption device 108) can combine the partial computations as part of generating the cryptographic key. The multi-party computation can only be completed if the tablet receives enough partial computations. If the tablet receives too few partial computations, the tablet cannot generate the authentication cryptogram.

Thus at least some of the support devices 104-106 have to come to a consensus in order to generate the authentication cryptogram. Secret shares and multi-party computations are discussed in more detail in sections III and VI.

If the authentication cryptogram is successfully generated, the tablet can transmit the cryptogram to the email server (decryption device 110). The email server can decrypt the cryptogram and evaluate the encrypted data within. The encrypted data may include or be associated with an assurance level, indicating how sure the user devices 102 are that the authorization request is legitimate as well as user identifying information. The encrypted data can also include confidential information, such as a password or biometric. This user identifying information may have been provided by one of the support devices 104-106 or the encryption device 108. Based on this information, the email server can transmit a response back to the tablet, allowing the user to access their email using the tablet. Notably, the user was not directly involved in the process and did not have to provide any login information to the tablet, resulting in a more user friendly experience. The following section discusses the overall system as well as the support devices 104-106, encryption device 108, and decryption device 110 in greater detail.

III. Support Devices and System

A. System Level Diagram

FIG. 1B shows a block diagram of an authentication system according to embodiments, including a group of user devices 102 including a number of support devices 104-106, an encryption device 108, a decryption device 110, and a side channel 112.

The user devices 102 may include any number of support devices along with one or more encryption device 108. The user devices 102 may be associated with a user in some way. As examples, the user devices 102 may be devices owned, leased or rented by a user. User devices 102 may include any number of cryptographic devices able to act as support devices or encryption devices during an encryption operation. Some examples include smartphones, smartwatches, laptop computers, desktop computers, videogame consoles, smart cars, among others.

FIG. 1B explicitly shows two support devices, support device 104 and support device 106. These support devices may possess one or more secret shares. These support devices may play a supporting role in generating an authentication cryptogram. The support devices may individually perform security assessments, and provide secret shares, partial computations or derived values to the encryption device 108 based on those security assessments.

Support devices 104-106 may communicate with one another and the encryption device 108 via any suitable means of communication. As examples, support devices 104-106 may communicate via Ethernet, USB, FireWire, etc. Support devices 104-106 may communicate via a wireless interconnection, such as Wi-Fi, Bluetooth, Bluetooth low energy (BLE), etc. The support devices 104-106 may communicate with one another and the encryption device via a secure or unsecured network, such as the Internet or a cellular network. Support device 104-106 may also communicate through a hub or proxy device. The hub or proxy device may mediate communicate between user devices 102. Support devices 104-106 may communicate in a peer-to-peer manner.

Support devices 104-106 may possess a processor, a computer readable medium, and a secure memory. The secure memory may securely store one or more secret shares, and may be located on or within the computer readable medium. The computer readable medium may also contain one or more software applications or software modules. These software applications or software modules may be used by support devices 104-106 in order to perform methods according to some embodiments.

Support device 104-106 may communicate with the decryption device 110 via a side channel 112. These communications may include messages or security assessment reports. The decryption device 110 may consider these communications when authenticating the encryption device 108. As an example, a security assessment report may indicate that user devices 102 are insecure and authentication cryptograms should be treated with suspicion.

Communications between user devices 102 may be encrypted or unencrypted. As an example, user devices 102 may perform one or more Diffie-Hellman key exchanges in order to establish cryptographic keys. These cryptographic keys may be used to encrypt and decrypt communications transmitted between user devices 102.

Encryption device 108 may transmit a request for security assessment to support devices 104-106. Encryption device 108 may receive secret shares, derived values, or partial computations from support devices 104-106. Further, encryption device 108 may combine secret shares, values derived from those secret shares, or partial computations in order to produce a cryptographic key. Encryption device 108 may also use the cryptographic key to produce an authentication cryptogram. Encryption device 108 may transmit authentication cryptograms and assurance levels to the decryption device 110.

Encryption device 108 may possess a processor, a computer readable medium, and a secure memory. The secure memory may securely store one or more secret shares, and may be located on or within the computer readable medium. The computer readable medium may also contain one or more software applications or software modules. These software applications or software modules may be used by encryption device 108 in order to perform some or all of the functions listed above.

The encryption device 108, may be similar to support devices 104-106. The encryption device 108 may communicate with user devices 102 and decryption device 110 in an encrypted or unencrypted manner, and may communicate via a wired or wireless interconnection. Further encryption device 108 may communicate via a network such as the Internet or a cellular network. The encryption device 108 may perform these functions using any number of suitable protocols, standards, or techniques.

The decryption device 110 may be capable of decrypting authentication cryptograms received from the encryption device 108 in order to authenticate the encryption device 108. This may involve generating a decryption key using a collection of secret shares, derived values or partial computations, and using the decryption key in order to decrypt an authentication cryptogram. The decryption device 110 may further evaluate the decrypted authentication cryptogram and any received assurance levels in order to authenticate encryption device 108. The decryption device 110 may receive messages or other communications from support devices 104-106 via a side channel 112. The decryption device 110 may take evaluate these messages or communications as part of authenticating encryption device 108. In some embodiments, decryption device 110 may instead be a decryption system including a collection of decryption devices. The decryption devices of the decryption system may collectively decrypt authentication cryptograms using a multi-party decryption method. For example, the decryption devices of the decryption system may each store secret shares associated with a shared secret, and use their secret shares to generate a cryptographic key that can be used to decrypt received authentication cryptograms.

B. Support Devices

As stated above, a support device may be a personal electronic device, such as a smart phone, smart watch, smart car, tablet, laptop, and desktop computer, etc. A support device may operate special software applications in order to perform support device functions. A support device may possess a processor and computer readable medium, and may possess one or more secret shares stored on a secure memory. A support device may communicate with other devices via a wired or wireless interconnection, and may communicate over networks such as the Internet or a cellular communication network.

A support device may act as a support device in some contexts and act as an encryption device in other contexts. For example, a user may attempt to access their email using their laptop. The laptop may generate an authentication cryptogram with the support of the user's smart phone. In this case, the laptop acts as the encryption device and the smartphone acts as a support device. At another time, the user may attempt to access their email using their smart phone. The smartphone may generate an authentication cryptogram with the support of the user's laptop. In this case, the smart phone acts as the encryption device and the laptop acts as a support device.

Support devices may be listed or otherwise registered in a registry. Each support device and the encryption device may possess a copy of the registry. Additionally or alternatively, a hub or proxy device may possess a copy of the registry.

Support devices may be registered via a registration process. This registration process may occur when a new support device is added to an existing user device network. Alternatively, if no user device network exists, a new user device network may be created. The creation of a new user device network may involve creating a new registry and adding the new support device as the first entry in the registry. The new registry may be created at the new support device or at a proxy or hub device. Multiple support devices may be registered in the registry simultaneously.

During the registration process, a support device may be provisioned with one or more secret shares. These secret shares may be provisioned to the support device by other support devices and the encryption device, a hub or proxy device, a trusted external server, or the decryption device. Alternatively, the support device may possess secret shares before it is registered in the device network, or may be provisioned secret shares after it is registered in the device network.

Support devices may possess a classification, based on the support device or encryption device's device configuration capability and the device's security capability. The device's configuration capability may refer to how easy it is to modify or reprogram the device. The device's security capability may refer to how secure the device.

The following subsections will discuss support device registration, support device classification, and secret shares in more detail.

1. Registration

Each support or encryption device in the user device network may be equipped with a registry of other support or encryption devices. This registry may be used by each support device to identify and perform a security assessment on each other support device and the encryption device. As a new device is registered to, or removed from the user device network, the registry may be updated to reflect the change in the composition of the network. In some cases, this may be mediated by a hub or proxy device.

A registry may take various forms. As an example, the registry could be a data structure such as a list or relational database that maintains enough information to uniquely identify each registered support device and the encryption device. For example, this may include information such as a unique identifier, such as a serial number, and/or an IP address or MAC address. When a new device is added to the user device network and the registry, the new device may transmit a unique identifier and its IP address to each other device in the user device network. The new device may transmit a unique identifier and its IP address to a hub or proxy device. Each device may update their respective registry such that the new device is now registered in the user device network. In the case of a hub or proxy device, the hub or proxy device may transmit the information to each other support device or encryption device in the cryptographic device network, and each device may update their respective registry.

A support device or encryption device may likewise be removed from the device registry as needed. As an example, a user may replace and sell an old laptop. As the laptop no longer belongs to or is associated with the user, it may be removed from the user device network. This may be accomplished via a software application, and it may occur automatically. For example, if the user performs a factory reset of the laptop before selling it, the factory reset may result in the laptop being removed from the user device network.

A support or encryption device that is being removed from the user device network may transmit a message or indication to all other devices in the user device network or a proxy or hub device. This message may indicate that the device is leaving the network, and should be removed from each device's respective registry. Each device may remove the device from its respective registry, resulting in the device being "deregistered" from the network.

In some cases, registering a device may additionally involve establishing mutual authentication with all devices currently in the user device network. This may involve setting up an encryption system such that all communications between support or encryption devices in the device network are end-to-end encrypted. This may involve the use of a key exchange protocol between the new device and each other device in the cryptographic device network, such as a Diffie-Hellman key exchange. Alternatively, a key exchange may occur before or after the device is registered. Devices may further use transport based encryption such as TLS or the Opacity protocol.

When a new support or encryption device is registered in the user device network, it may be provisioned secret shares. These secret shares may be generated by other support devices or the encryption device, or by a trusted external server or party. In some cases, the trusted external server may be a decryption device.

Alternatively, the support device may possess or be provisioned with secret shares before it is registered in the device network, or may be provisioned with secret shares after it is registered in the device network.

2. Classification

Support and encryption devices may be categorized or classified by their security level, a metric describing how secure the device is. This classification can be used as part of a device security assessment (see section V below). An encryption device with a high security level may be trusted by the support devices, while an encryption device with a low security level may not be trusted as much. As a result, the device security assessment may be more or less stringent depending on the level of trust corresponding to the security level. Further, the classification may relate to a number of secret shares provisioned to a support device. A support device that has a low security level may be more easily compromised by a hacker. As a result, a hacker may be able to acquire the secret shares on that support device. In order to minimize risk, less secret shares could be provisioned to that support device.

Figure 2:
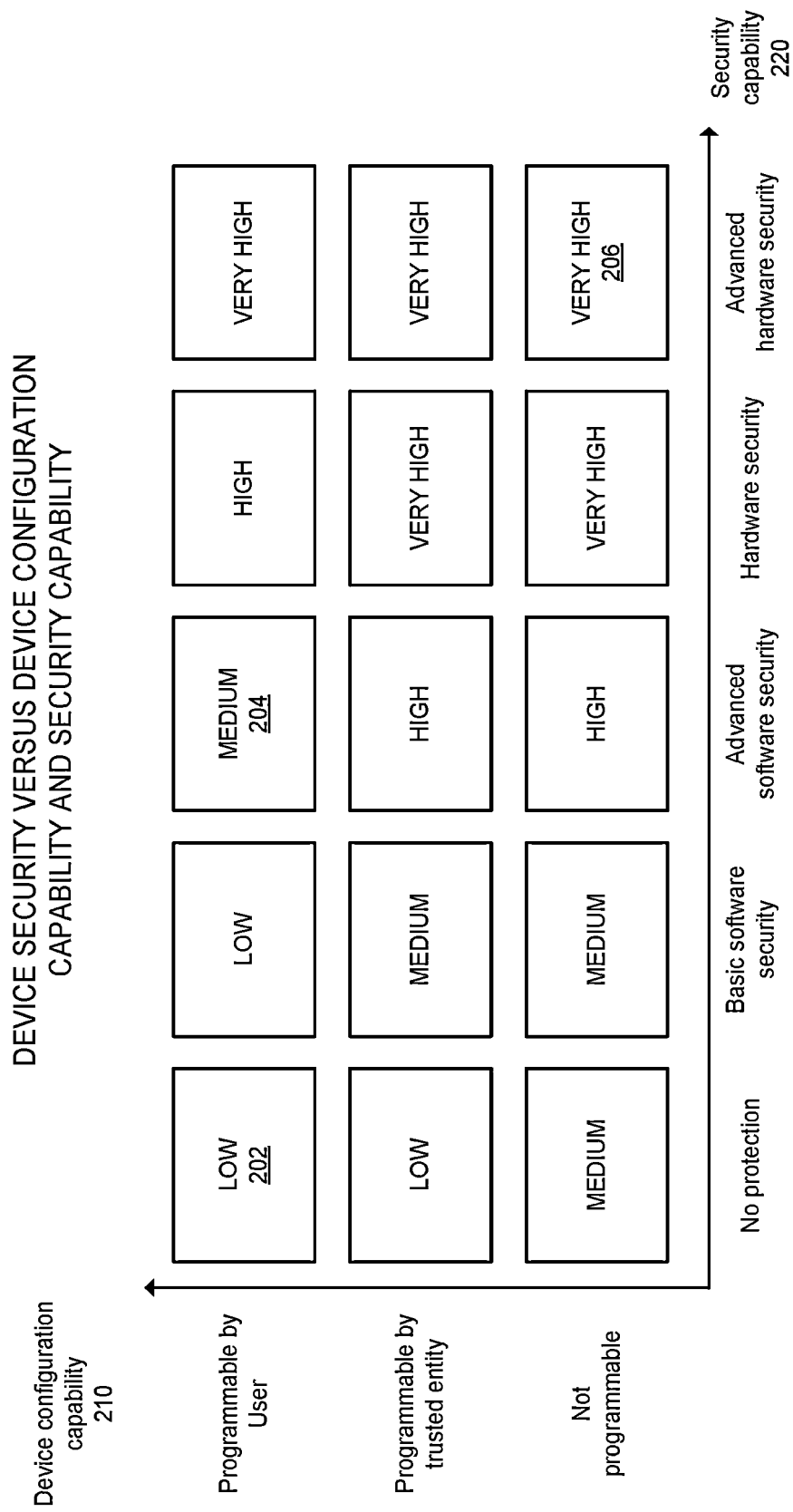
FIG. 2 shows a device security classification chart according to some embodiments.

FIG. 2 shows a plot of support or encryption device security versus device configuration capability 210 and security capability 220. The x-axis details the device's security capability 220, and increases from right to left. The y-axis details the device's configuration capability 210 and increases from bottom to top. Each box corresponds to a support or encryption device with security capability 220 relative to its position on the x-axis and device configuration capability 210 relative to its position on the y-axis. As an example, a device can be classified as having medium security 204 if it is programmable by a user and has advanced software security.

Shown are three example device configuration capabilities: Programmable by user, such as a personal computer; programmable by a trusted entity, such as a smart car that may only be programmed by a licensed mechanic; or not programmable, such as a metro smart card.

Also shown are five example security capabilities: No specific protection (e.g., native OS without any firewall or other protection software), basic software based security (e.g., signed code), advanced software based security (e.g., white box access detection), hardware based security (e.g., secure boot or a secure execution engine), or advanced hardware based security (e.g., a tamper resistant system).

Device security decreases as it becomes more easily configured and increases as its security capability increases. Device 202 is an example of a low security device. Device 206 is an example of a very high security device.

Device security may correlate to how devices are provisioned secret shares. A device with higher device security can be provided with more secret shares than a device with low security. This is because the device with a higher device security is less likely to be compromised. As a result, a hacker or malicious user is less likely to acquire the secret shares stored on that device. Likewise, device security may be factored into the device security assessment. A device with low security may experience a stricter assessment than a device with very high security. For example, a low security encryption device can more easily be compromised by a fraudster. As a result, the likelihood that an authentication cryptogram is being generated for a fraudulent purpose is higher, and support devices may compensate by performing a stricter security assessment.

3. Secret Share

Each support device and the encryption device may possess one or more secret shares. These secret shares may be derived from a shared secret (or "secret") and may be kept hidden from other devices in the user device network. A device may be provisioned a secret share or secret shares when the device is added to the user device network or when the device is registered in a registry.

The secret shares may be based on, or derived from a secret sharing system. The secret sharing system may be an m-out-of-n secret sharing system. In such a system, any collection of m secret shares, out of a total number of secret shares n are sufficient to generate or recreate a shared secret.

One secret sharing method is Shamir's secret sharing. With Shamir's secret sharing, a shared secret is encoded as a coefficient in a polynomial P(x), usually the zeroth order coefficient, P(0). The degree of the polynomial (one less than the number of coefficients, or the greatest power term in the polynomial) is equal to the value m−1. The coefficients of the polynomial may be generated randomly or via another suitable method. Each of n support devices may be given one or more sampled values of the polynomial as its secret share. For example, in a group of 5 devices, the first device could be provided with P(1) and P(2), the second with P(3) and P(4), and so on until the $5^{th}$ device is provided with P(9) and P(10). This may be accomplished using any appropriate secure provisioning system. For example, a trusted external server may perform a Diffie-Hellman key exchange with each support device in the user device network. The trusted external server may then transmit the secret shares to their corresponding devices.

Provided m is less then n, it is possible to reconstruct the polynomial P(x) given m secret shares. This is a consequence of the fact that m unique points uniquely define a polynomial of degree m−1. It may be possible to reconstruct the polynomial via a form of polynomial interpolation, such as the use of Lagrange Polynomials.

Once the polynomial is constructed, the value P(0) can be determined and used as part of a cryptographic process. For example, the value P(0) may be used by the encryption device as a cryptographic key. Alternatively, the secret shares and the shared secret may be used as part of a more complex operation such that their value is disguised. Instead of P(0) being reconstructed, a value derived from or associated with P(0) may be reconstructed. Further, the generated value is usually associated with a cryptographic nonce, a one-time randomly generated value. In this way the shared secret remains hidden, but the values derived from it can be generated consistently by encrypting and decrypting devices. Thus the value can be used as a symmetric encryption key or be used to derive a symmetric encryption key, enabling the encryption device to produce an authentication cryptogram and the decryption device to decrypt it.

Shamir's secret sharing is one of many methods used to distribute secret shares such that a shared secret may be reconstructed. There are many other such methods, and the description above is intended only as a non-limiting example.

The support devices and encryption device may generate new secret shares in order to provide those new secret shares to the new support or encryption device. This may involve a process that is similar, but not identical to the method used to generate an authentication cryptogram. An encryption device may request a security assessment as part of generating new secret shares for the new support or encryption device. Each support device currently registered in the user device network may perform a security assessment of the encryption device, the other support devices, and the new device. Based on the security assessment, each support device may choose to provide one or more secret shares. These secret shares may be used by the encryption device to reconstruct the shared secret, or a value derived from the shared secret. From this value, new secret shares may be produced and transmitted to the new support or encryption device as part of the registration process.

As an example, using Shamir's secret sharing, the shared secret exists as the coefficient in a polynomial. Each secret share corresponds to a sampled value of that polynomial. By collecting a threshold number of secret shares, the shared secret and the polynomial can be reconstructed. From the polynomial, new secret shares can be generated by sampling the polynomial at new values. These new secret shares may be transmitted to the new support or encryption device as part of the registration process. In some cases, rather than transmitting the secret shares themselves, derived values or partial computations may be transmitted to the encryption device. The encryption device may combine these derived values or partial computations in order to produce new secret shares.

In some cases, rather than reconstructing the shared secret and the polynomial in its entirety, a value derived from the shared secret or a derived polynomial may be constructed. In this case secret shares may be generated from that derived value or polynomial, and may be provided to the new support or encryption device.

There are many other ways in which the support devices and the encryption device may generate shared secrets to provision them to a new support or encryption device, the description above is intended only as a non-limiting example.

Figure 3:
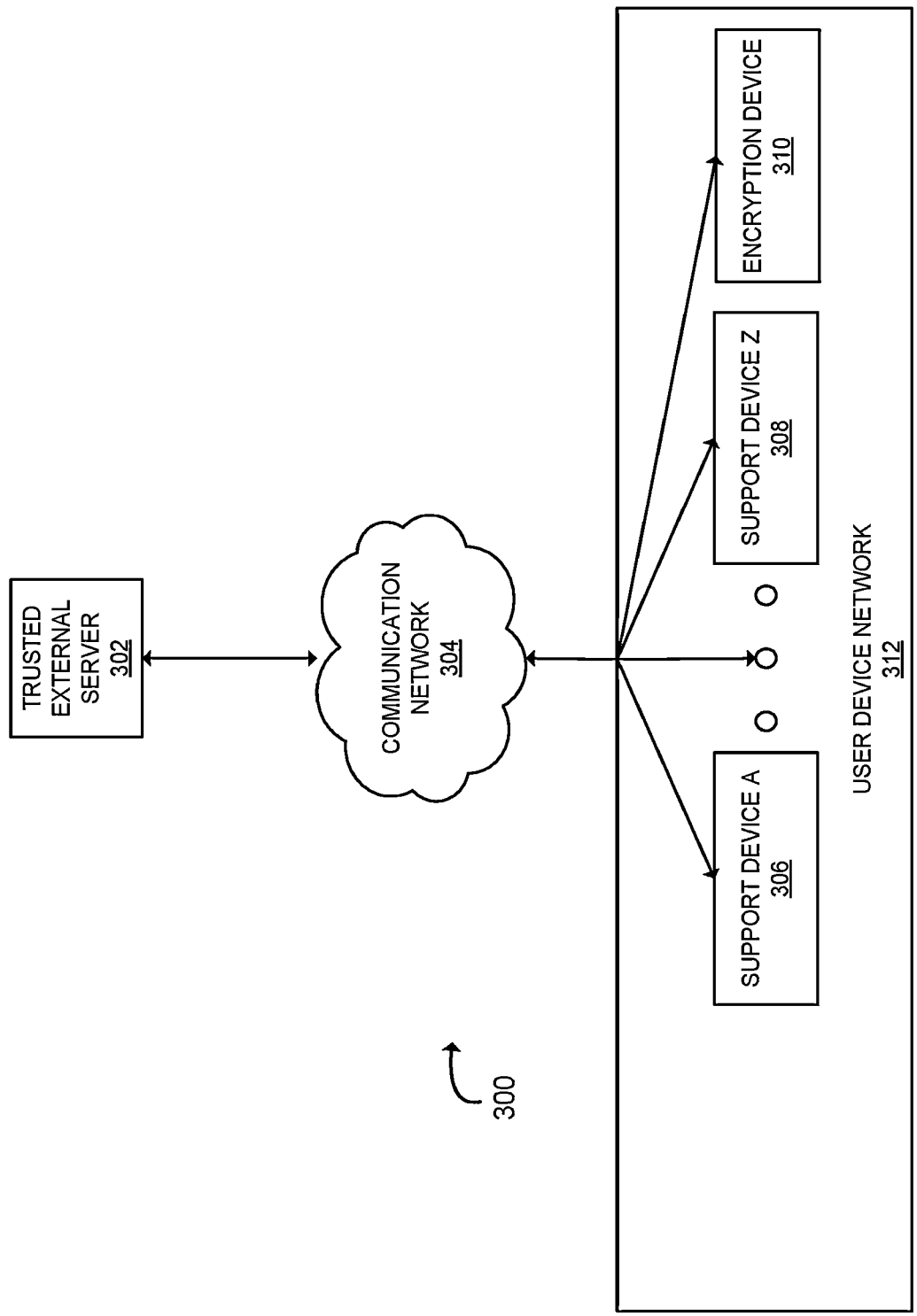
FIG. 3 shows a secret share provisioning network according to some embodiments.

Alternatively, secret shares may be provisioned to support devices or the encryption device via a trusted external server. FIG. 3 shows a system block diagram including a trusted external server 302, a communication network 304, and a user device network 312 including support devices 306-308, and an encryption device 310.

The trusted external server 302 could be a server or device capable of communicating with support devices 306-308 and the encryption device 310 via a communication network 304 such as the Internet, a cellular communications network, or a wide area network (WAN) or local area network (LAN). The trusted external server 302 may possess a processor and a computer readable medium and may be capable of any operations necessary to generate a secret value or secret shares. As an example, the trusted external server 302 may generate a number of random numbers using a cryptographically secure random number generator, interpret those random number as the coefficients of a polynomial P(x) and evaluate that polynomial for distinct values of x. The trusted external server 302 may also have the capability to establish secure communication with a number of user devices and transmit those distinct values to user devices in the user device network 312, including support devices 306-308 and the encryption device 310.

The communication network 304 may include a network such as the Internet or a cellular communications network by which devices, computers, and servers can communicate with one another. The communication network 304 may be secure or unsecure. Devices may communicate over this network via any number of accepted protocols, such as the Transmission Control Protocol (TCP) or the User Datagram Protocol (UDP). Communications over the communication network 304 can be either encrypted or unencrypted.

The user device network 312 may include a number of user devices, each in operative communication with one another or a proxy or hub device. The user device network 312 may be substantially similar to the user devices 102 in FIG. 1B. The user device network 312 may include a number of support devices 306-308 as well as an encryption device 310.

Support devices 306-308 may possess a processor, communications interface and computer readable medium. These support devices 306-308 may be substantially similar to support devices 104-106 from FIG. 1B. They may possess a secure memory on which a secret share or secret shares may be securely stored along with software or other applications that enable them to take on a supporting role during the generation of a cryptogram.

The trusted external server 302 may generate secret shares and transmit the secret shares in an encrypted or unencrypted form through the communication network 304 to the user devices in the user device network 312. The trusted external server 302 may be a decryption device, such as the decryption device 110 from FIG. 1B, or another server, such as a web server. The trusted external server 302 may perform a key exchange with devices in the user device network 312 in order to securely transmit data such as secret shares to the devices in the user device network 312.

C. Encryption Device

An encryption device may be a device capable of generating authentication cryptograms for the purpose of authentication a user or the encryption device itself. In some cases, an encryption device may act as a support device. For example, a laptop may be used as an encryption device to authenticate a user so that they can access their email server. A smart phone may act as a support device, perform a security assessment and transmit secret shares, partial computations or derived values to the laptop. The laptop may use those secret shares, derived values, or partial computations to generate a cryptographic key, which may be used to encrypt information such as an assurance level or information that uniquely identifies the user. This encrypted information, the authentication payload may be transmitted to a decryption device. At another time however, the roles may be reversed, the smart phone may act as the encryption device and the laptop may act as a support device. Thus an encryption device may also be a support device and a support device may also be an encryption device.

An encryption device may possess a processor and a computer readable medium coupled to the processor. The encryption device may possess code or an application that allows it to perform functions and operations necessary to perform consensus-based online authentication. This may include generating commitment messages, combining partial computations, producing a key generation seed, producing a cryptographic key, and generating an authentication cryptogram using that cryptographic key. The encryption device may also possess a secure memory, which one or more secret shares may be stored on.

D. Decryption Device

A decryption device may include any device capable of receiving authentication cryptograms, decrypting authentication cryptograms, and interpreting the decrypted contents and authenticating a user or encryption device based on that contents. Further, a decryption device may be capable of receiving communications from support devices via a side channel. The decryption device may consider these communications when determining whether to authenticate a user or encryption device.

A decryption device may be capable of generating a cryptographic key for the purpose of decrypting the authentication cryptogram. The decryption device may generate this key in a manner substantially similar to how an encryption device generates a cryptographic key. This may involve combining secret shares or partial computations, generating a key generation seed, and generating a cryptographic key based on that key generation seed.

In some cases, the decryption device may instead be a decryption device network, including a decryption device and a number of support devices. The support devices may possess one or more secret shares. The decryption device may receive one or more secret shares from the support devices. The decryption device may request a security assessment from the support devices before receiving secret shares or decrypting the authentication cryptogram.

Alternatively, the decryption device may simply possess one or more cryptographic keys that may be used to decrypt authentication cryptograms. These cryptographic keys may correspond to different assurance levels. As an example, the decryption device may possess three cryptographic keys, corresponding to a low, medium and high assurance level. The decryption device may decrypt authentication cryptograms using the key corresponding to the correct assurance level. The decryption device may be informed of the assurance level by the encryption device and may use the corresponding key to decrypt the authentication cryptogram. The decryption device may not be informed of the assurance level, and may attempt to decrypt the authentication cryptogram with each cryptographic key in turn until the authentication cryptogram is successfully decrypted.

The decryption device may evaluate the decrypted information in order to determine whether to authenticate the user or the encryption device. As an example, the authentication cryptogram may consist of encrypted information that uniquely identifies the user (such as a saved password, biometric, etc.) along with an encrypted assurance level. The authentication cryptogram may be associated with a stated assurance level (e.g. "medium"). The decryption device may decrypt the authentication cryptogram and compare the now decrypted assurance level with the stated assurance level, a predetermined assurance level, or a predetermined threshold assurance level. If they match, the decryption device may compare the uniquely identifying information to information stored on the decryption device in an external database in order to authenticate the user. The decryption device may then compare the assurance level to a predetermined assurance level. For example, the decryption device may not authenticate any users or encryption devices if a "low" assurance level is provided. If the assurance level meets the threshold assurance level, the decryption device may authenticate the encryption device or the user.

The decryption device may not necessarily be aware of support devices or the number of support devices in the user device network. In some cases, the decryption device may interface only with an encryption device or a hub device.

IV. Consensus Authentication Process

Figure 4:
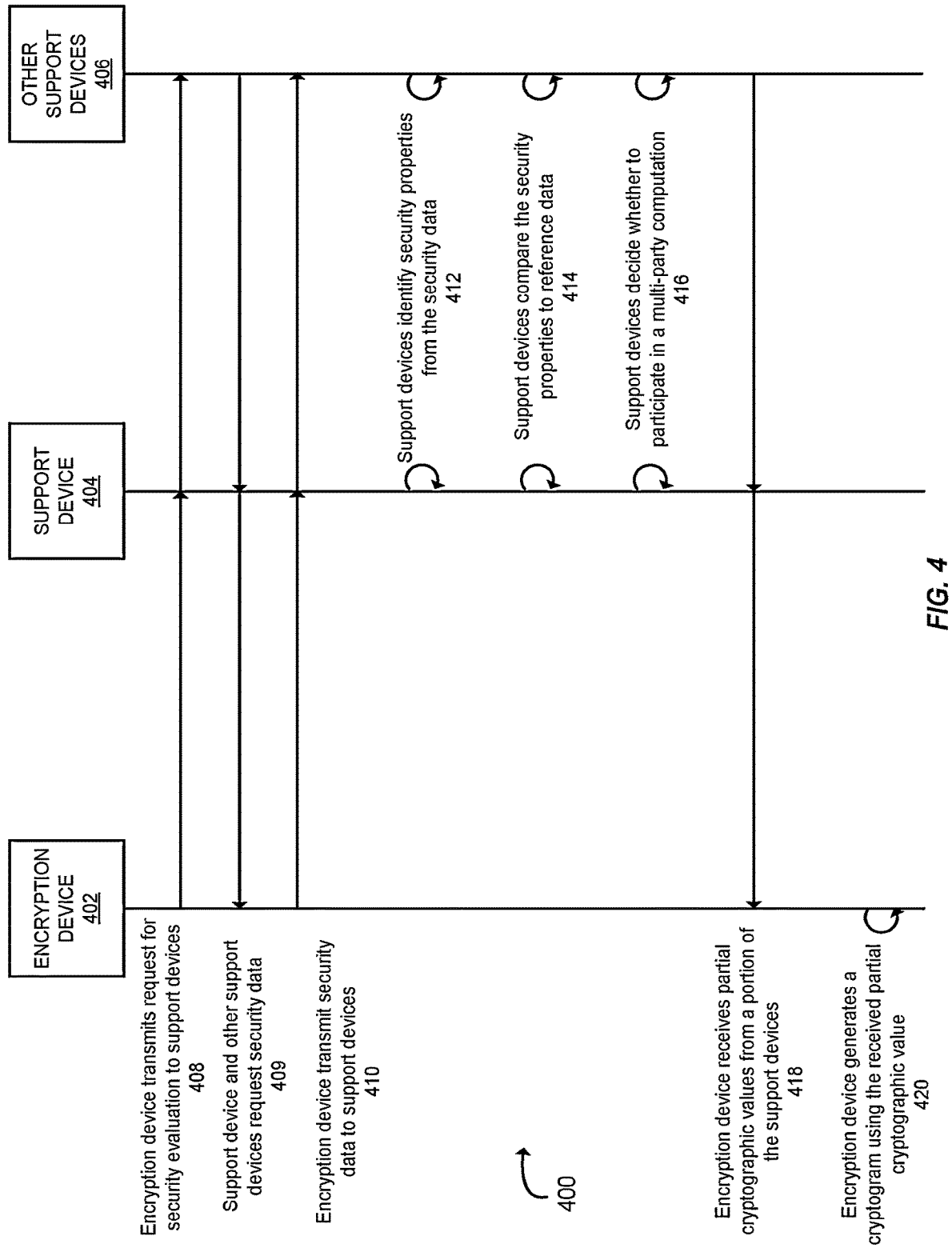
FIG. 4 shows a method of generating an authentication cryptogram according to some embodiments.

A process for performing a security evaluation and generating an authentication cryptogram may be better understood with reference to FIG. 4.

FIG. 4 shows a communication flow diagram of a method 400 performed by an encryption device 402, a support device 404, and a collection of other support devices 406.

At step 408, the encryption device 402 may transmit a request for a security assessment to the support device 404 and other support devices 406. The request for security assessment may be generated or transmitted from an application executing on the encrypting device. Alternatively, the request for security assessment may be generate or transmitted from another device, such as a support device 404 or other support device 406. Further, the request for security assessment may further request that the support device 404 and other support devices 406 participate in a multi-party computation to generate an authentication cryptogram. This request may be transmitted directly to the support device 404 and other support devices 406, or indirectly. It may be transmitted via a network, such as the Internet or a cellular communications network. It may be transmitted via Bluetooth, Wi-Fi, USB, FireWire, Ethernet, or any other suitable communication means. It may be transmitted in accordance with any number of communication protocols or standards. In some cases the request may be transmitted through a hub or proxy device which mediates communication between the encryption device 402, the support device 404, and other support devices 406.

At optional step 409, the support device 404 and other support devices 406 can request security data from the encryption device 402. The support device 404 and other support devices 406 can use this security data as part of the user or device security assessment. For example, security data including a stored biometric template can be transferred from an encryption device 402 such as a tablet to a support device 404 such as a smart watch. The smart watch can compare the biometric template against a biometric template stored on or accessible to the smart watch as part of the security assessment. The request for security data can be transmitted directly, via a hub or proxy device, or via a network such as the Internet or a cellular communications network.

At step 410, the encryption device 402 may transmit security data to the support device 404 and other support devices 406. Like the request for security assessment, the security data may be transmitted using any appropriate means, standards or protocols, and in some cases may be transmitted through a hub or proxy device. The security data may be in an encrypted or compressed form, and may include a number of security logs. The security data may include any number of security properties which may be used to assess the security state of the encryption device 402, the support device 404, and the other support device 406, such as application signature, laptop device configuration and fingerprints, user identity and authentication status, anti-malware protection status, laptop location, local time, and usage data, among others. In some embodiments, the support device 404 and other support devices 406 may receive or collect security data from other sources, such as support devices or external entities, such as a hub or proxy server.

At step 412 the support device 404 and other support devices 406 may identify one or more security properties from the security data. These security properties may include any number of the security properties listed above, additionally, the security properties may include identification data, such as one or more signed digital certificates that can be used by the support device 404 or other support device 406 to identify a source of the security data. In some cases the security data may be in an encrypted form, and may have to be modified or interpreted by the support device 404 and other support devices 406 in order to extract the security properties. The security data may be in log form, in which case the support device 404 and other support devices 406 may scan or parse the logs in order to extract the security properties.

At step 414 support device 404 and other support devices 406 may compare the security properties to reference data. Each support device may possess or have access to its own set of reference data. This reference data may include a number of historical security properties recorded over time. For example, support device 404 may possess reference data for the encryption device's 402 location over the previous year. It may also include an application signature of an encryption based application executing on the encryption device 402. Further, the historical data may include biometric information, such as a thumb print or pulse record. The reference data may include examples of low, medium, or high assurance authentication events. The reference data may include other evaluations or classifications, such as high risk locations and high risk time periods. Additionally, the reference data may include one or more previous user authentication risk estimates, relating to the risk of authenticating a particular user at a given time period.

Additionally, as part of comparing security properties to reference data, support device 404 or other support devices 406 may involve identify a source of the security data (e.g., the encryption device 402) as a peer in a group of devices (e.g., user devices 102 from FIG. 1). The support devices may authenticate the source of the security data by verifying the signed digital certificate, using any appropriate conventional digital certificate verification or authentication technique.

The support device 404 may share any possessed reference data with the other support devices 406. Likewise, the other support devices 406 may share any possessed reference data with the support device 404. This sharing may be accomplished via a wired or wireless, direct or indirect communication channel. In some cases, data may be shared between the support devices via a hub or proxy device which mediates communication between the encryption device 402, the support device 404, and other support devices 406.

Comparing the security properties to the reference data may involve comparing the security data to the reference data to identify any anomalies. For example, a security property corresponding to location may be compared against historical locations. The encryption device 402 may have been historically found within one area or region, such as a particular city or state. If the encryption device 402 is outside that area or region, the support device 404 or other support devices 406 may note an anomaly. The support device 404 or other support devices 406 may determine and evaluate the distance between the typical or historical encryption device 402 region and the region as reported by the encryption device 402. The support device 404 or other support devices 406 may perform some form of statistical analysis, such as a t-test in order to determine the likelihood of observing the encryption device in that location. The support device 404 or other support devices 406 may also compare the encryption device's 402 reported location versus a list of high risk locations.

Other such comparisons include evaluating any application signatures provided by the encryption device 402. The encryption device 402 may execute an application that enables the encryption device 402 to perform consensus-based online authentication. This application may have an application signature, a parameter that characterizes the application. The application signature may be compared to historical application signatures. A change in the application signature may indicate that the application has been modified, which may be an indication of a compromised program or encryption device 402. Support device 404 and other support devices 406 may also analyze the hardware or software security state of the encryption device 402. Such as whether the device has basic software based security, such as signed code, advanced software based security, such as white box access detection, or hardware based security such as secure boot or secure execution engine. Support device 404 or other support devices 406 may also determine if the encryption device 402 possesses a firewall, anti-malware, or anti-virus software, and may evaluate the degree to which the encryption device 402 can be modified by a user or fraudster (such as evaluating whether or not the device can be reprogrammed by a user). These security comparisons may result in numerical error or risk values. These error or risk values may indicate the degree to which an individual security property is anomalous. These security comparisons may be performed with the use of one or more AI algorithms, such as machine learning classifiers, such as a support vector machine, which may be used to classify combinations of security properties into anomalous or normal classifications. There are many other such security comparisons and security comparison methods, those above are intended only as a non-limiting example.

At step 416 the support device 404 and other support devices 406 may decide whether to participate in a multi-party computation. This decision may involve evaluating the error or risk values described above against a threshold error or risk value. For example, each error or risk value corresponding to each property of the security properties may be summed and compared against a threshold. As another example, each error or risk value could be compared to its own corresponding threshold, e.g., a risk value corresponding to distance could be compared against a threshold corresponding to distance. As another example, each error or risk value could be averaged using a traditional or weighted average in order to produce a single value which may be compared against a threshold. As yet another example, each error or risk value could be evaluated by an artificial intelligence or machine learning model. This model could take in each error or risk value as an input and arrive at a decision as to whether to participate in the multi-party computation or not. The support device 404 and each other support device 406 could determine, based on the error, risk score, or other factors, the number of secret shares or derived values they each may contribute to the multi-party computation.

At step 418 the encryption device 402 may receive partial cryptographic values from some or all of the support devices. The encryption device 402 may receive a number of partial cryptographic values less than or equal to the total number of secret shares distributed to the support device 404 and the other support devices 406. The partial cryptographic values may include secret shares or values derived from secret shares, such as partial computations, values which may be combined in some way to produce a value associated with or derived from the shared secret. The partial cryptographic values may be transmitted in an encrypted form, and may be decrypted by the encryption device 402. The partial cryptographic values may also be transmitted to the encryption device 402 via a hub or proxy device.

At step 420, the encryption device 402 may combine the partial cryptographic values to produce a cryptographic key, which may be used to generate the authentication cryptogram. The cryptographic key may be produced if the encryption device 402 received more than a threshold number of partial cryptographic values from the support device 404 and the other support devices 406. In some cases the encryption device 402 may produce different cryptographic keys depending on the number of partial cryptographic values received. These different cryptographic keys may correspond to different assurance levels, such that the cryptographic key produced using a small number of cryptographic values corresponds to a low assurance level and a cryptographic key produced using a large number of cryptographic values corresponds to a high assurance level.

The cryptographic key may be generated using an appropriate key generation algorithm, such as an Advanced Encryption Standard key generation algorithm. This may be accomplished by combining the received partial cryptographic values using a mathematical or software function and applying those received partial cryptographic values as the input to a key generation algorithm. Once the cryptographic key is generated, it may be used to generate the authentication cryptogram by encrypting a message or statement using the cryptographic key. For example, if an AES cryptographic key is generated, the encryption device 402 may encrypt a message or statement according to AES to generate the authentication cryptogram.

The cryptographic key may be used to generate the authentication cryptogram. The authentication cryptogram may take a number of forms. For example, the authentication cryptogram could be an encrypted statement of the assurance level determined by the support device 404 and the other support devices 406 during the security evaluation. When the authentication cryptogram is decrypted by a decryption device, the decryption device could evaluate the statement and authenticate or not authenticate the encryption device 402 based on its contents. For example, the decryption device might only authenticate encryption devices 402 that are able to produce a high assurance level cryptogram.

The authentication cryptogram might also take the form of an encrypted expected statement, such as "decrypted successfully." This statement may be used to verify that the cryptogram was decrypted successfully. A decryption device might attempt to decrypt the authentication cryptogram using any number of cryptographic keys corresponding to any number of assurance levels, and evaluate the result against the known statement. If the authentication cryptogram is decrypted using an incorrect encryption key, the result is expected to be an unintelligible statement or collection of numbers. Once the decryption device successfully decrypts the authentication cryptogram with the right encryption key, the decryption device can compare the expected statement against the known statement. If they match, a decryption device may infer the assurance level based on the cryptographic key used, and authenticate the encryption device 402 based on the assurance level.

After generating the authentication cryptogram, the encryption device 402 may optionally transmit the authentication cryptogram to a decryption device, either directly or via a proxy or hub device.

V. Security Assessment

As discussed above, consensus-based online authentication may involve a security assessment protocol or "security assessment," which may be initialized by the encryption device. For example, the encryption device can transmit a request for security assessment to one or more support devices.

The one or more support devices can perform the security assessment using security data and security properties provided by the encryption device. Further, the one or more support devices may share security data, security properties, and reference data with each other as part of the security assessment. The security assessment may include an assessment of the encryption device, other support devices, or the general context of the generation of the authentication cryptogram.

Each support device may use the collected information to perform an individual security assessment. An individual security assessment may relate to the nature of the authentication cryptogram generation, such as whether or not the authentication cryptogram is being generated for a fraudulent purpose. For example, if a fraudster is attempting to generate an authentication cryptogram for the purpose of illegally accessing a user's private medical records, a number of support devices may determine that the authentication cryptogram is being generated for fraudulent purposes.

Based on its respective security assessment, each support device may contribute a number of secret shares or derived values to the encryption device so that the encryption device can generate a cryptographic key. The cryptographic key may be used to generate an authentication cryptogram. The authentication cryptogram may be sent to a decryption device and the decryption device may decrypt the authentication cryptogram and authenticate the encryption device based on its contents.

If a support device determines that the authentication cryptogram is probably being generated for a fraudulent purpose, the support device may not contribute any secret shares or derived values to the encryption device. If enough support devices refuse to participate, the encryption device may not have enough secret shares or derived values to meet the minimum threshold number to produce a cryptographic key. In this way, the support devices have effectively blocked the generation of the authentication cryptogram, based on the security assessment. Additionally, the support devices may communicate with the decryption device via a side channel, such as the side channel 112 shown in FIG. 1B. This communication may indicate to the decryption device that an authentication cryptogram that it has received or might receive is likely fraudulent. The decryption device as a result may decide not to authentication the encryption device as a result.

The security assessment can include a device security assessment and a user security assessment. The device security assessment involves an assessment of each support device and the encryption device. The support devices exchange data with one another relating to device security, such as the current state of firewall or anti-virus software, historical states of the devices, etc. The user security assessment involves an assessment of the user or contextual information involving the user. The user security assessment can include the transmission of data such as a user behavioral profile or biometric information. This data can be used to gauge the user's state. For example, the user security assessment can include a determination as to whether the user is present at the encryption device. If the user is present at the encryption device, it follows that the user is likely involved in the generation of the cryptogram. The user security assessment can also include a user authentication risk estimate, which indicates the level of risk associated with authenticating the user.

The following subsections discuss the device security assessment, user security assessment, and assurance levels in greater detail.

A. Device Security Assessment

As part of the overall security assessment process, the support devices may evaluate the encryption device and the other support devices. This may include collecting security data from the encryption device and the other support devices, extracting any relevant security properties from that security data, and comparing it to reference data, such as currently approved configurations, behavioral profiles, and historical states.

Historical data or historical states may include previous locations where authentication cryptograms were generated, previous purposes for generating an authentication cryptogram (e.g., to access an email account, to purchase an item, etc.), previous times at which authentication cryptograms were generated, previous IP addresses of the encryption device.

The support devices may determine whether or not the encryption device is acting in some malicious capacity in generating the authentication cryptogram. The support devices may further determine whether or not other support devices are conspiring with the encryption device or are otherwise acting in a malicious capacity.

As an example, a fraudster may have stolen a laptop and a tablet. The fraudster may have modified a security assessment performing application on the tablet. The fraudster may attempt to use the laptop to make a purchase, and may attempt to generate an authentication cryptogram for this purpose. The tablet, using the modified security assessment application may conclude through its modified security assessment that the authentication cryptogram is being generated for a legitimate purpose. In this way the compromised tablet is conspiring with the laptop in order to generate an illegitimate authentication cryptogram.

A device configuration may refer to how the device is configured to perform its associated functions. For a computer system such as a laptop, the device configuration may refer to a number of settings associated with that device. For example, the laptop may be configured such that no programs or applications may be installed on the laptop without administrator approval. As another example, the laptop may be configured such that applications may only communicate with remote servers over private networks, such as a home Wi-Fi network, and not public networks, such as the Wi-Fi network at a coffee shop. As another example, the device configuration could refer to the settings in the device registry, a database that stores low-level settings for the operating system.

Another example of device configuration are port settings or port forwarding settings. A device may be configured to receive communications via a particular port, a communication endpoint in an operating system. A device may also be configured such that communications cannot be received over a specific port or over a range of ports. A device may be configured such that changing allowed or disallowed ports may only be performed by a network administrator.

Further, firewall, malware, or anti-virus settings may also be considered device configurations. The security state of the firewall, or the sensitivity of anti-malware and anti-virus software may be included. For example, whether or not a device uses a sandbox to execute untested or untrusted programs or code. There are a number of factors or features that may be described as device or security configurations, those above are intended only as non-limiting examples.

A support device may receive data corresponding to the device or security configuration of the encryption device and other support devices. This data may take many forms, such as an ordered list with fields relating to each relevant setting or configuration for that device. These fields may be compared against an approved configuration.

For example, an approved configuration may include the following settings: "don't allow any third party or unapproved programs to be installed under any condition," "only communicate over this accepted port range," and "perform a virus scan once per hour." The support device performing a security assessed may compare the received data against this approved configuration. If the encryption device or support device being assessed has a configuration such as "allow third party program installation," "freely communicate," and "perform a virus scan only when prompted," the assessed device does not meet the approved configuration, likewise, the support device may determine that there is a low level of assurance, or significant risk associated with the assessed device, and may refuse to provide any secret shares, or provide only a few secret shares to the encrypting device as a result.

The state of a device may refer to any collection of variables that may describe that device ("state variables"). In many cases, a state variable or collection of state variables may overlap with a device's configuration. For example, a state variable such as firewall status (i.e., is the firewall currently enabled?) may also be considered to be a configuration. State variables may also include specific hardware states, such as the contents of specific blocks of memory, such as random access memory in the device. State variables may also include factors such as whether or not the device has sound enabled, what the volume is set at. In the case of a smartphone support or encryption device, it may include whether or not the camera or microphone is enabled, the current battery level, which apps are running, etc. State data may also include the location of the device, or whether or not it is paired with any other devices, e.g., via Bluetooth. In effect the state of a device may include any discernable characteristic that describes that device.

The state may be expressed as a list or database of state variables that may be transmitted to one or more support devices as part of the security assessment. The received state may be compared to historical state data as part of the security assessment.

Historical state data may include any number of state variables recorded over any length of time. For example, historical state data may have been recorded over a twelve hour period, a day, a month, a year, etc. In some cases historical state data may have been recorded over a number of events. For example, during each of the last ten security assessments, a support device may record and store the state data received during each of those security assessments. Further, the support devices and the encryption device may exchange state data at regular or irregular intervals in order to establish records of historical state. For example, each night at 10:00 P.M., each device may exchange state data with one another.

The received state data may be compared against the historical state data to determine any anomalies. If the received state data differs from the historical state data, the support device may conclude a low assurance level as part of its security assessment, and may refuse to provide any secret shares or derived values to the encryption device. If the received state data matches the historical state data, the support device may provide some number of secret shares or derived values to the encryption device.

As an example, a support device may compare the location of the assessed encryption or support device versus the historical location of that device over time. If current received location is substantially different than a typical location inferred from the historical location state data, the support device may view that as suspect. The support device may use any appropriate algorithm to evaluate a substantial difference.

For example, if the historical state data suggests that the assessed device is highly localized, e.g., rarely moves from a house or apartment owned by the user, if the assessed device is 100 miles away, the support device may find that suspect. On the other hand, if the assessed device frequently moves (as is the case with a smart phone or smart car), the support device may attribute little weight or bearing to the assessed device's location. Further, if there is some measurable or noticeable trend in the location of the assessed device over time (e.g., the user is taking a road trip, and the device is generally moving west to east across some geographic area), a "substantial difference" may constitute some deviation from the expected path of that device over time, for example, if the device is generally moving west to east across the United States, and then the current location data shows the device in Somalia. These factors or methods may be analyzed using any number of models, algorithms, or heuristics. For example, machine learning algorithms, predictive filters, ensembles, etc.

As another example, the assessed device may have established a clear pattern, and deviation from that pattern may be considered suspect. If for example, a device is always in a silent or muted state, and current received state data indicates that the volume has been maximized, that may indicate that an entity other than the user (who presumably prefers the volume state to be silent) is operating the device. This may be viewed by the assessing support device as suspect.

The support device may attribute more weight or bearing to some differences in state variables over others. For example, a state variable such as "number of pictures stored on flash memory" may not be attributed much weight, while a state variable such as the location of the device may be weighted highly. Further, each difference between historical state values and the current state values may be converted or expressed as a number such as an error term. These error terms may be combined in some manner, such as an average and compared to a threshold in order to determine whether or not the assessed device is suspect. In some cases, these differences may be viewed in terms of some rule set. A rule from the rule set may dictate "do not provide any secret shares or derived values if the device is 500 miles or more from its expected location." In this case, the assessing support device may cease its assessment process, and provide no secret shares or derived values, once it determines that the assessed device is more than 500 miles from its expected location.

In some cases differences between the current received state data and the historical data may be applied as the input to an artificial intelligence or machine learning model. As an example, a support vector machine may be trained, based on labelled data to identify suspect devices and non-suspect devices. The state data received, or the difference between the state data and the historical data may be provided as an input to this support vector machine, and the support vector machine may provide a classification as to whether or not the assessed device is suspicious.

Further, the device security assessment may produce a "gradient response," i.e., an assessing support device may not determine whether or not an assessed device, such as the encryption device or another support device is "suspicious" or "not suspicious," and may rather determine a degree of suspicion. This degree of suspicion may be represented as a probability, such as the probability that the assessed device has been compromised by a fraudster or malicious user. For example, in the case of a good security assessment, i.e., the device is configured according to an approved device configuration, and the state of the device does not deviate to a great degree from the historical state of the device, the probability of compromise may be determined by the assessing support device to be low (e.g., 1%). In the case of a bad security assessment, the probability of compromise may be determined by the assessing support device may be high (e.g., 75%).

A support device may provide secret shares proportional to this probability score or other calculated gradient response. As an example, the support device may "plan" on providing ten secret shares or derived values, and provide one less secret share or derived value for each 10% probability of compromise (i.e., for a probability of 0% the support device provides ten secret shares or derived values, for a probability of 70% the support device provides three secret shares or derived values, and for a probability of 100% the support device provides no secret shares or derived values.

The device security assessment may also include a behavioral component. This behavioral component may assess the recent operations performed by the encryption device or other support devices over a period of time. Examples of such operations include transmitting data to an external server, deleting data stored in memory, allocating memory to some new purpose, executing applications, attempting to access protected resources, etc.

The device's usual behavior may constitute common patterns or sequences of operations that are performed by the device over a number of appropriate timeframes. For example, the device may typically receive emails from an email server once every twenty minutes. This pattern may constitute a behavior.

A encryption device or support device may transmit its recent operations or behaviors in any suitable form. For example, this may be an execution log, a detailed list of processes executed by the assessed device over a period of time. This execution log may be compared against historical execution logs in order to determine whether or not the assessed device is exhibiting abnormal behavior.

For example, if historical behavior data suggests that the assessed device rarely performs a specific operation or series of operations (such as attempting to access a protected unit of memory) and the currently received behavior or execution log shows the device performing that operation a large or significant number of times, the assessed device may be considered to be exhibiting abnormal behavior. This abnormal behavior may indicate or characterize a compromised or suspect encryption or support device. The assessing support device may consider this abnormal behavior in its security assessment.

The comparison of current received behavioral information and historical behavioral information may be conducted using a number of methods, many of which may be substantially similar to the methods used to compare received state data and historical state data. The assessing support device could determine an error or deviation value based on the difference between the historical behavior data and the currently received state data, and may determine that an assessed device is suspect if this error or deviation value exceeds a predetermined threshold. The assessing support device may use an artificial or machine learning algorithm to assess and classify a device's behavior. The assessing support device may use a ruleset in order to evaluate assessed device behavior, and the assessing support device may assign weights or other values that indicate the bearing individual behaviors have on the assessment.

To conclude, in order to determine whether an authentication cryptogram generation operation is legitimate, each support device from a collection of support devices may receive security data, including a number of security properties from an encryption device and other support devices. These security data and security properties may relate to configuration characteristics, device states, and behavioral characteristics. Each support device may compare the received data to historical data, which may be transmitted, pooled, or exchanged between the devices. This assessment may allow each support device to conclude whether or not the encryption device and each other support device are suspect or may be compromised. Each support device may arrive at its own individual conclusion. Based on this conclusion, each support device may contribute a number of secret shares or derived values to the encryption device. Each support device may contribute more secret shares if it determines that the likelihood of the encryption devices or other support devices being compromised is low, and may contribute less secret shares if it determines the likelihood of the encryption device or other support devices being compromised is high.

B. User Security Assessment

Each support device may also perform a user security assessment as part of the overall security assessment protocol. This user security assessment may involve evaluating sensor data or other information that may be related to the state of the user. As an example, a user security assessment may involve the use of a pulse oximeter on a smart watch. If the pulse oximeter detects a pulse, it suggests that someone, likely the user, is wearing the smart watch. Similarly, a recent thumb print scan, as part of unlocking the smart watch may be included in the user security assessment. Other examples of user state data may be inferred from other sensors, such as accelerometers or balance sensors coupled to smart phones or smart watches. Regular variations in accelerometer motion may characterize the user's gait, the various ways in which the user moves. These inferred gait patterns could be compared to historical gait patterns, and a significant difference may be indicative that an entity other than the user possesses the smart watch or smart phone.

The user security data may be transmitted from devices close to the user that are capable of interpreting or measuring the user state to devices that are far from the user that are incapable of interpreting or measuring the user state. For example, a smart watch may be well positioned to measure many user characteristics, via sensors such as a skin conductance sensor, skin temperature sensor, oximetry sensor, heart rate monitor, etc. A laptop on the other hand may not be able to measure these user characteristics. Support devices such as smart watches or smart phones may transmit this collected user data to other support devices, such as laptop or desktop computers such that those other devices may use that data in their security evaluation.

The user security assessment may be conducted by comparing sensed or inferred user data with historical user data or a user record and measuring deviations between current data and historical data. If deviations exceed some predetermined threshold, assessing support devices may conclude that the user state is suspect and as a result may not contribute secret shares or derived values to the multi-party computation. Alternatively or additionally, assessing support devices may make use of an artificial intelligence or machine learning model, for example, a support vector machine. A model such as a support vector machine may take in user data collected by the support devices and produce a classification as to whether or not the user state is suspect. In other cases, the support device may use a rule set to assess whether the user state is suspect. As an example, if no heartbeat is detected by a smart watch, that may be an indication that the user is not present. This may be considered suspect depending on the context of other security data.

Further, the user security assessment may involve evaluating behavioral characteristics of the user. For example, the user may be known to frequently authenticate for the purpose of accessing their email, or purchasing a good from a frequently accessed web vendor. If these authentications occur frequently or habitually, they may constitute typical user behavior. If the encryption device attempts to authenticate for one of these purposes, it suggests that the user is probably involved in the authentication process.

The user security assessment and device security assessment may be used by the support device in tandem, or in addition to one or more other security assessments in order to determine whether or not the context of the authentication cryptogram generation, or the encryption device or other support devices are suspect. Each support device may contribute a number of secret shares or derived values based on the results of these security assessments.

Additionally, some support devices may possess personally identifying information or other information that may be used to authenticate a user, for example, a biometric template. These support devices may transmit this template to the encryption device, such that the encryption device includes this personally identifying information in the authentication cryptogram. The decryption device may verify this information against an existing record in order to authenticate the encryption device.

In some cases, user presence may not be established (e.g., no heartbeat is detected via a heartbeat sensor on the smart watch). In these cases, the encryption device may query additional user information or authentication from the user. This may involve the user inputting a password, providing a biometric, or answering a secret question, among others.

C. Assurance Levels

As discussed above, systems and methods of consensus-based online authentication may provide for a number of different assurance levels. These assurance levels may indicate how sure the system is of the legitimacy of the authentication cryptogram. A high assurance level indicates that the authentication cryptogram is very likely being generated on behalf of the user, and not a fraudster. A low assurance level indicates that the authentication cryptogram is probably being generated on behalf of the user.

Assurance levels may be based on a secret share threshold. The secret share threshold may dictate the minimum number of secret shares or derived values necessary for the encryption device to generate a cryptographic key. This is a component of m-out-of-n secret sharing, where m secret shares out of n are needed to reproduce a single "shared secret" or a value derived or associated with the shared secret. The shared secret or derived value may be used either as a cryptographic key, or as part of a process to generate a cryptographic key. This cryptographic key may be used in order to produce the authentication cryptogram.

In a case where there are multiple assurance levels, there may be multiple shared secrets corresponding to each assurance level, and multiple thresholds corresponding to each secret and each assurance level. For example, using a Shamir's secret sharing approach, three assurance levels could correspond to three polynomials, and three shared secrets encoded in those polynomials. Each assurance level could have a different threshold, $m_1$, $m_2$, $m_3$. For example, for twelve support devices (n=12), the low assurance level $m_1$ could equal four, the medium assurance level $m_2$, could equal 7, and the high assurance level $m_3$ could equal ten. In this way a different shared secret or derived value is generated depending on the number of participating support devices.

If participating support devices provide less than four secret shares to the encryption device, no shared secret or derived value can be constructed. As a result, a cryptographic key cannot be generated and used to generate the authentication cryptogram. If between four and six (inclusive) secret shares are provided to the encryption device, it may construct the shared secret or derived value corresponding to a low assurance level. A cryptographic key corresponding to a low assurance level can be generated, and may be further used to generate an authentication cryptogram corresponding to a low assurance level.

If participating support devices provide between seven and nine (inclusive) secret shares to the encryption device, it may construct the shared secret or derived value corresponding to a medium assurance level. A cryptographic key corresponding to a low assurance level can be generated, and may be used to generate an authentication cryptogram corresponding to a medium assurance level.

Likewise, if participating support devices provide ten or more secret shares to the encryption device, it may construct the shared secret or derived value corresponding to a high assurance level. A cryptographic key corresponding to a high assurance level can be generated, and may be used to generate an authentication cryptogram corresponding to a high assurance level.

The authentication cryptogram may be transmitted to the decryption device. The decrypting device may decrypt the authentication cryptogram using a cryptographic key corresponding to the cryptographic key used to encrypt the authentication cryptogram. That is, the decryption device may generate and use a cryptographic key corresponding to a low assurance level to decrypt a low assurance authentication cryptogram, etc.

The authentication cryptogram may be paired with an assurance number, indicating the number of secret shares used to generate the cryptographic key used to generate the authentication cryptogram. The decryption device may interpret this number and generate a cryptographic key corresponding to the assurance level. For example, if the authentication cryptogram is paired with the number "7," the decryption device may assume that seven secret shares were used to produce the cryptographic key, corresponding to a medium assurance level. The decryption device may generate a medium assurance level cryptographic key and decrypt the authentication cryptogram using the medium assurance level cryptographic key.

In some cases, the decryption device may possess a number of secret shares, or may be part of a decryption network in which secret shares are provided to a number of support devices which aid in decryption. The decryption device may receive the same number of secret shares (7) as used to generate the authentication cryptogram, and may subsequently generate a cryptographic key. This cryptographic key may be used to decrypt the authentication cryptogram.

Likewise, the authentication cryptogram may be associated with a message or statement indicating the assurance level, such as "low," "medium," or "high." The decryption device may generate a cryptographic key corresponding to the stated assurance level and decrypt the authentication cryptogram using that cryptographic key.

In some cases, the authentication cryptogram may not be paired with any number, message, statement, or indication. In this case the decryption device may employ a method such as "guess and check" in order to decrypt the authentication cryptogram. Provided the number of assurance levels is reasonable, the decryption device may generate cryptographic keys corresponding to each assurance level in turn, and try to decrypt the authentication cryptogram with each cryptographic key. If a decryption results in a computer or human readable message, the correct cryptographic key was used to decrypt the authentication cryptogram. If the decryption does not result in a computer or human readable message, an incorrect key was used, and the decryption device may generate and try other cryptographic keys until it produces the correct cryptographic key.

VI. Multi-Party Computation

The encryption device may perform a secure multi-party computation using secret shares or derived values transmitted to the encryption device from the support devices. This secure multi-party computation may be based off an m-out-of-n secret sharing scheme, wherein the encryption device may collect a threshold number m of secret shares or derived values out of a total number n of secret shares or derived values in order to reconstruct a shared secret or a value derived from the shared secret. The secret sharing scheme may allow the share secret or a value derived from the shared secret to be reconstructed regardless of the secret shares used. As an example, given a three-out-of-five secret sharing scheme, with secrets {A, B, C, D, and E}, the same shared secret or derived value may be reconstructed regardless of the three shares used. Secrets {A, B, and C} may produce the same shared secret as {B, D, and E}. The shared secret or derived value may be used by the encryption device to generate a cryptographic key. The cryptographic key may be used to generate an authentication cryptogram by encrypting assurance information or information that uniquely identifies a user. This authentication cryptogram may be transmitted to a decryption device, which may decrypt the authentication cryptogram using a corresponding cryptographic key, and may interpret the decrypted information in order to authenticate the encryption device.

The secure multi-party computation may make use of pseudorandom functions. The secure multi-party computations may use pseudorandom functions such as an elliptic curve group, a hashing algorithm, or other pseudorandom functions such as the AES cryptosystem in order to emulate or approximate a random oracle, which may be used to obfuscate one or more secret shares, generating one or more derived values or partial computations in the process. The secure multi-party computation may additionally involve the generation of random or pseudorandom numbers for the purpose of further protecting secret shares or the shared secret. The secure multi-party computation may involve combining secret shares, partial computations, or derived values to produce a value derived from, related to, or associated with a shared secret. This derived value may be used as the input of a key generation algorithm, such as an AES key generation algorithm operating in propagated cipher block chaining mode, electronic codebook mode, cipher feedback mode, counter mode, etc. This key may be used to encrypt assurance level information and data that uniquely identifies the user in order to generate an authentication cryptogram. The steps above are intended only as examples, there are numerous ways to accomplish a secure multi-party encryption using an m-out-of-n secret sharing scheme.

The encryption device may transmit the cryptogram along with any information necessary for the decryption device to generate its own cryptographic key and decrypt the authentication cryptogram. This may include any random numbers generated by the encryption device as part of the secure multi-party computation. It may also include a "commitment message," a message or value that may be used to verify that a cryptographic operation was performed correctly.

The decryption device may possess the shared secret in its entirety, or may possess a collection of secret shares. The decryption device may include a decryption network, including a decryption device and a number of support devices, each possessing a secret share. In this case, the decryption device may receive or collect secret shares from the support devices in order to complete a multi-party computation similar to the multi-party computation completed by the encryption device. This multi-party computation may involve collecting a threshold number of secret shares in order to generate the same cryptographic key as generated by the encryption device. This cryptographic key may be used to decrypt the authentication cryptogram, such that its contents may be analyzed.

Figure 5:
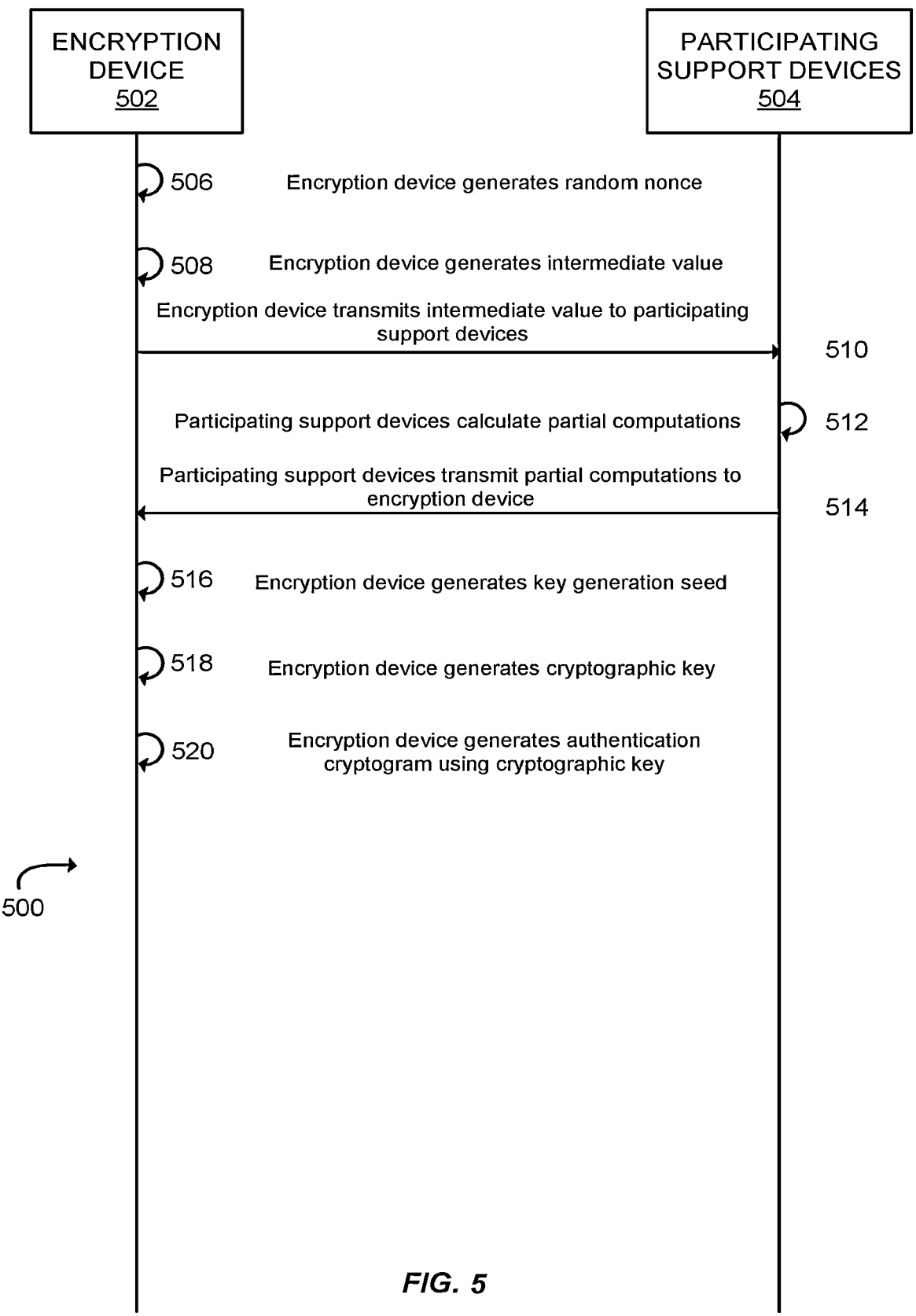
FIG. 5 shows a multi-party computation according to some embodiments.

FIG. 5 shows an example multi-party computation to generate an authentication cryptogram according to some embodiments. FIG. 5 shows a method 500 performed by an encryption device 502 and participating support devices 504.

At step 506 the encryption device 502 may generate a random nonce. This may be accomplished using a pseudorandom number generator.

At step 508 the encryption device 502 may generate a commitment message based on the assurance level and user information received from the support devices during the security assessment. In some embodiments, the user information may be encrypted. This commitment message may be generated using software or code implementing a pseudorandom function, such as elliptic curve cryptography.

At step 510 the encryption device 502 may transmit the commitment message to participating support devices 504. The participating support devices 504 may include support devices that have decided to contribute one or more secret shares or derived values to the multi-party computation. This may be accomplished using communication interfaces on the encryption device 502 and the participating support devices 504. The commitment messages may be transmitted using an appropriate protocol in an encrypted or unencrypted form. Additionally, the commitment message may be transmitted through a communication network, such as the Internet or a cellular communications network. The encryption device 502 may transmit the commitment message to a hub or proxy device, and the hub or proxy device may distribute the commitment message to participating support devices 504.

At step 512 the participating support devices 504 may each use their respective secret shares and the commitment message to calculate a number of partial computations, such that the number of partial computations is equal or proportional to the number of secret shares or derived values that each participating support device 504 has chosen to contribute to the multi-party computation.

Partial computations may be generated in a number of ways. As an example, a partial computation produced by a support device may be defined $h=w^k$, where h is the partial computation, w is the commitment message and k is a secret share of the secret shares held by a support device. Each participating support device may generate a number of distinct partial computations, each produced by using the commitment message and a secret share of the secret shares held by that support device.

Another method to generate partial computations may involve the participating support devices 504 each generating a partial computation based on a distributed pseudorandom function such as the AES cryptosystem. Each participating support device may encrypt the commitment message using a secret share of its secret shares as a cryptographic key. A participating support may copy the commitment message a number of times and encrypt each copy with a different secret share of its collection of secret shares, in this way generating a number of partial computations that may be provided to the encrypting device 502 as part of the multi-party computation.

At step 514 the participating support devices 504 may transmit the partial computations to the encryption device 502. The partial computations may be received through a communication interface, may be transmitted in encrypted or unencrypted form directly or indirectly via a network, and may be transmitted to a hub or proxy device that may then transmit them to the encryption device.

At step 516 the encryption device 502 may generate a key generation seed based on the partial computations. This may involve combining the received partial computations in a number of ways. In an m-out-of-n secret sharing system based on Shamir's secret sharing, this may involve the generation of Lagrange coefficients.

As an example, the encryption device 502 may determine a Lagrange coefficient $\lambda_{i,S}$ for the secret S for each of the participating support devices 50. The encryption device 502 may then determine the cryptographic key seedy as $y:=\Pi_{i \in S} h_i^{\lambda_{i,s}}$ where $h_i$ are the partial computations and $\lambda_{i,S}$ are the calculated Lagrange coefficients. A partial computation raised to its Lagrange coefficient may be referred to as an intermediate calculation.

At step 518, the encryption device 502 generates a cryptographic key based on the key generation seed. This may be a symmetric key, such as an AES key, and may be generated using any number of key generation algorithms, such as an "aes-128-ctr" key generator.

At step 520 the encryption device 502 may encrypt the assurance level, user identifying information and random nonce using the cryptographic key generated at step 518 in order to produce the authentication cryptogram.

The above description is intended only as a non-limiting example of how a multi-party computation may be conducted by an encryption device 502 and participating support devices 504 in order to generate an authentication cryptogram.

The following subsections discuss device participation in greater detail, including different participation models and the association between device participation and assurance levels.

A. Binary Device Participation

Embodiments may support multiple support device participation models. As one example, in a binary participation model, each support device may possess a single secret share. Each support device may participate in a multi-party computation by transmitting that secret share, a derived value, or a partial computation to the encryption device. A support device may refuse to participate by not transmitting its secret share. An advantage of a binary participation model is its simplicity and fairness, no support device can contribute more shares or derived values than other support devices, thus no support device can push through an encryption operation when no other support device chooses to participate. Binary participation may be better understood with reference to FIG. 6.

Figure 6:
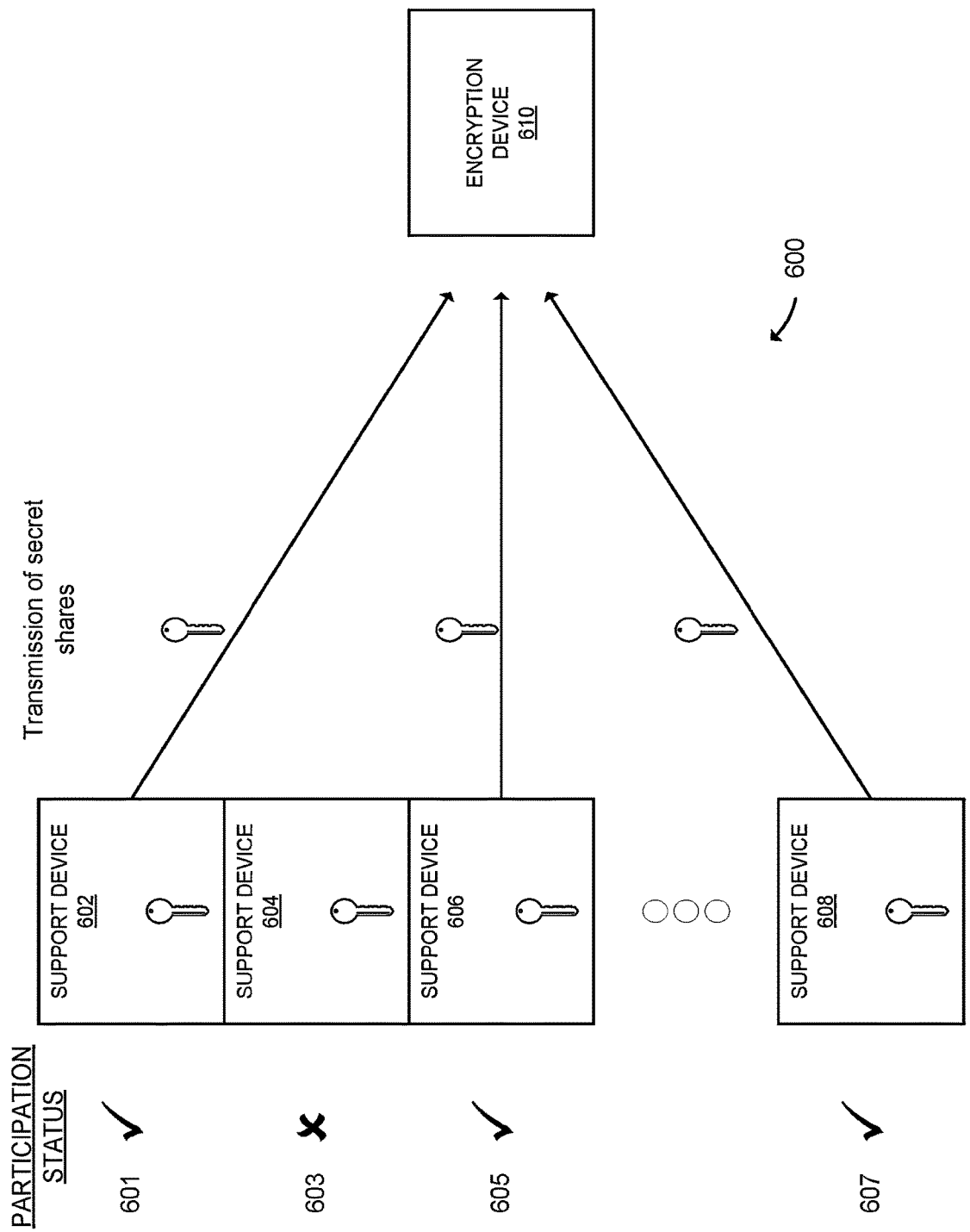
FIG. 6 shows a block diagram of support devices providing single secret shares to an encryption device as part of a multi-party computation according to some embodiments.

FIG. 6 shows a block diagram of a system 600 including support devices 602, B 604, 606, and 608 and an encryption device 610. Each support device in FIG. 6 possesses a single secret share.

In FIG. 6, each support device has its own participation status indicating whether that support device will participate in the multi-party computation with the encryption device 610. Participation status 601 corresponds to support device 602, participating status 603 corresponds to support device 604, participation status 605 corresponds to support device 606, and participation status 607 corresponds to support device 608. The decision to participate is indicated by a check mark, while the decision to not participate is indicated by an "x." A given support device may decide to participate based on its security assessment, see the section on security assessment above. In FIG. 6 support devices 602, 606, and 608, are shown participating in the multi-party computation, indicated by the check marks at their respective participation statuses 601, 605, and 607. These support devices may have concluded during the security assessment that the authentication cryptogram is being generated for a legitimate purpose, and may have decided to participate as a result. Support device 604 is show not participating in the computation. Support device 604 may have concluded during the security assessment that that the authentication cryptogram is being generate for an illegitimate purpose and may have decided not to participate as a result.

In FIG. 6, participation is shown as the transmission of secret shares, partial computations, or derived values, indicated by keys, between the support devices and the encryption device 610. These secret shares, or partial computations may be transmitted to the encryption device 610 in an encrypted or unencrypted form, either directly or indirectly through a network, or via a proxy or hub device.

The encryption device 610 may collect these secret shares or partial computations and combine them in some manner. As an example, if the encryption device 610 receives secret shares, it may combine those secret shares in order to reproduce a secret which may be used as a key in order to encrypt a message, producing a cryptogram. As another example, the encryption device 610 may combine partial computations according to a predetermined method in order to produce a cryptographic key, such as through the use of distribute pseudorandom functions.

Even without the participation of support device 604 and its corresponding secret share or partial computation, it may be possible to complete the multi-party computation. The system 600 may make use of a threshold-based secret sharing scheme, such as Shamir's secret sharing. Such schemes may enable reconstruction of a secret value, or cryptographic operations based on partial computations provided that a threshold number of support devices provide secret shares or partial computations. These threshold schemes may be referred to as "m-out-of-n," where m is the threshold number of secret shares, derived values or partial computations necessary to reproduce a shared secret or secret value, given a total number of secret shares n.

B. Partial Participation

A partial participation model is an alternative to a binary participation model. With partial participation each support device may possess a number of secret shares. In this case each support device may participate by transmitting one or more secret shares, derived values, or partial computations to the encryption device. The number of secret shares, derived values, or partial computations transmitted may be proportional to an assurance level determined by that support device during its security assessment. A support device may refuse to participate by not transmitting any secret shares. An advantage of the partial participation model is flexibility. An individual support device can participate to the extent of its assurance, i.e., provide more secret shares, derived values or partial computations if the support device is more sure and provide less secret shares, derived values, or partial computations otherwise. In this way the number of secret shares, derived values or partial computations received by the encryption device may better reflect the overall security assessment performed by the support devices. A partial participation model may be better understood with reference to FIG. 7.

Figure 7:
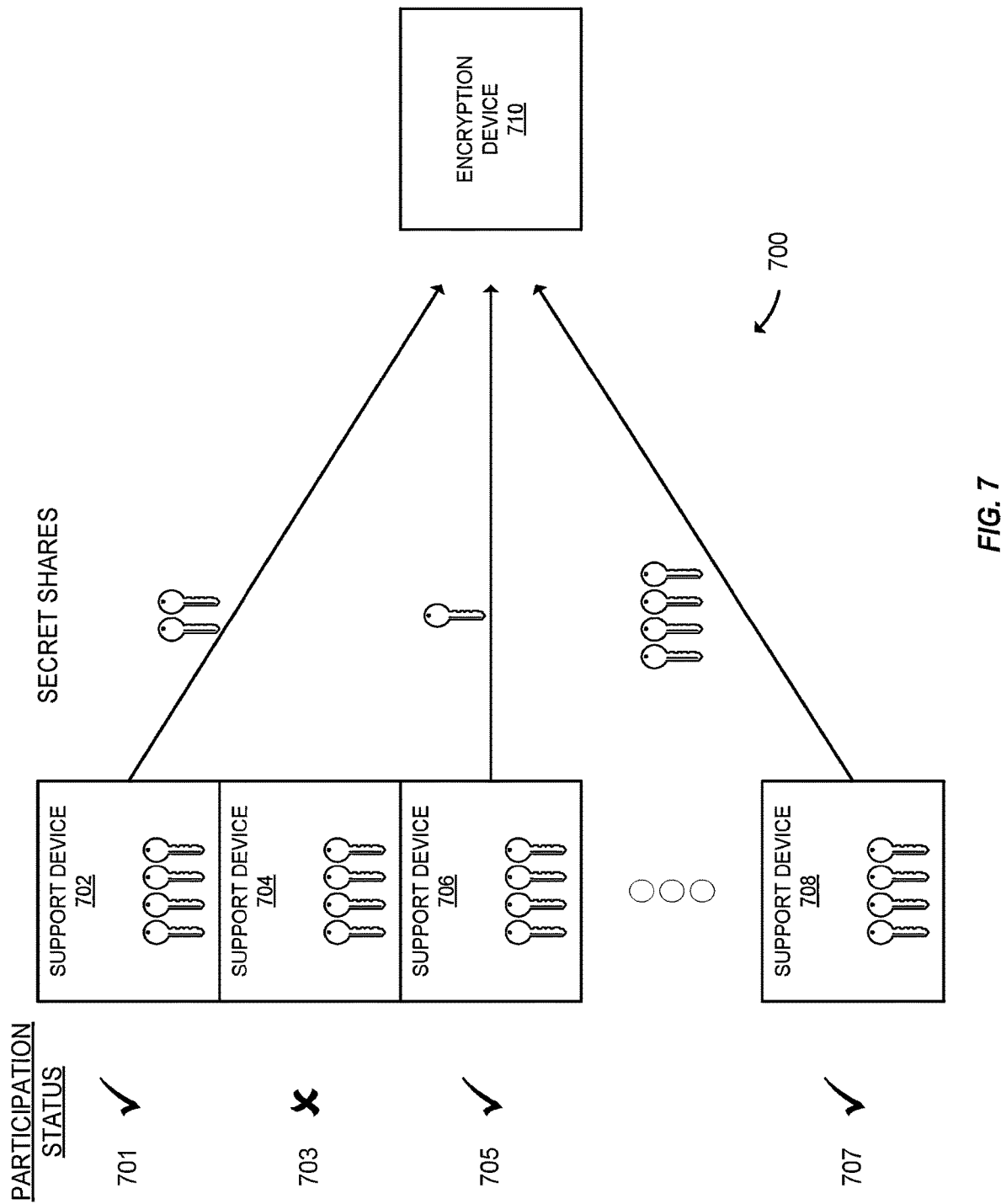
FIG. 7 shows a block diagram of support devices providing multiple secret shares to an encryption device as part of a multi-party computation according to some embodiments.

FIG. 7 shows a block diagram of a system 700 including a number of support devices, including support devices 702, 704, 706, and 708. Additionally shown is an encryption device 710. In FIG. 7, each support device possesses four secret shares, indicated by key symbols. Four secret shares were selected for the purpose of illustration, support devices 702-708 may possess any number of secret shares.

In FIG. 7, each support device has a participation status. Participation status 701 corresponds to support device 702, participation status 703 corresponds to support device 704, participation status 705 corresponds to support device 706 and participation status 707 corresponds to support device 708. In this case, support device 702, support device 706 and support device 708 are choosing to participate in the multi-party computation, indicated by check mark participation statuses 701, 705, and 707, and support device 704 is not participating in the multi-party computation, indicated by an "x" participation status 703.

The participating support devices may provide their secret shares, values derived from the secret shares or partial computations corresponding to the secret shares to the encryption device 710. Each support device may provide a different number of secret shares, derived values, or partial computations. In FIG. 7, support device 702 is shown providing two secret shares, while support device 706 provides one and support device 708 provides four.

Each support device that participates in the multi-party computation may provide a number of secret shares based on the results of its security assessment, as described above. As an example, support device 708 may have determined, based on its security assessment, that the authentication cryptogram is being generated for a legitimate purpose with 95% probability. Support device 708 may provide all four of its secret shares as a result. To continue the example, support device 706 may have determined, based on its security assessment, that the authentication cryptogram is being generated for a legitimate purpose with 55% probability. Support device 706 has determined that it is more likely than not that the authentication cryptogram is being generated for a legitimate purpose. However, in the view of support device 706 there is a significant chance that the authentication cryptogram is being generated for an illegitimate purpose. Support device 706 may provide only a single secret share, partial computation or derived value as a reflection of its determination.

Additionally, it may be the case that some support devices may possess more secret shares than other support devices. This may be preferable in cases where some support devices are more trustworthy than others, or more accurate in their security assessment. For example, a supporting device with strong hardware-based security may be less susceptible to compromise, and may be given more secret shares as a result. Likewise, a device with a fast processor and large amounts of random access memory (RAM) may be better able to perform a security evaluation that a weaker or less sophisticated device, and may be trusted with more shares. Further, a device may have more historical or reference data than other devices, and may better differentiate between fraudulent and legitimate encryption operations as a result. A smart watch which has been owned by a user for several years may been a part of more authentication cryptogram generations than a laptop purchased a month ago.

C. Participation and Assurance Level

The assurance level of the cryptogram can be related to support device participation. Depending on the number of shared secrets, derived values, or partial computations received by the encryption device, the encryption device can generate different cryptograms corresponding to different assurance levels. This means that when more support devices choose to participate, or contribute greater numbers of secret shares, a higher assurance cryptogram may be produced, indicating to the decryption device that a consensus exists among the support devices and the cryptogram is probably legitimate. The association between device participation and assurance level may be better understood with reference to FIG. 8.

Figure 8:
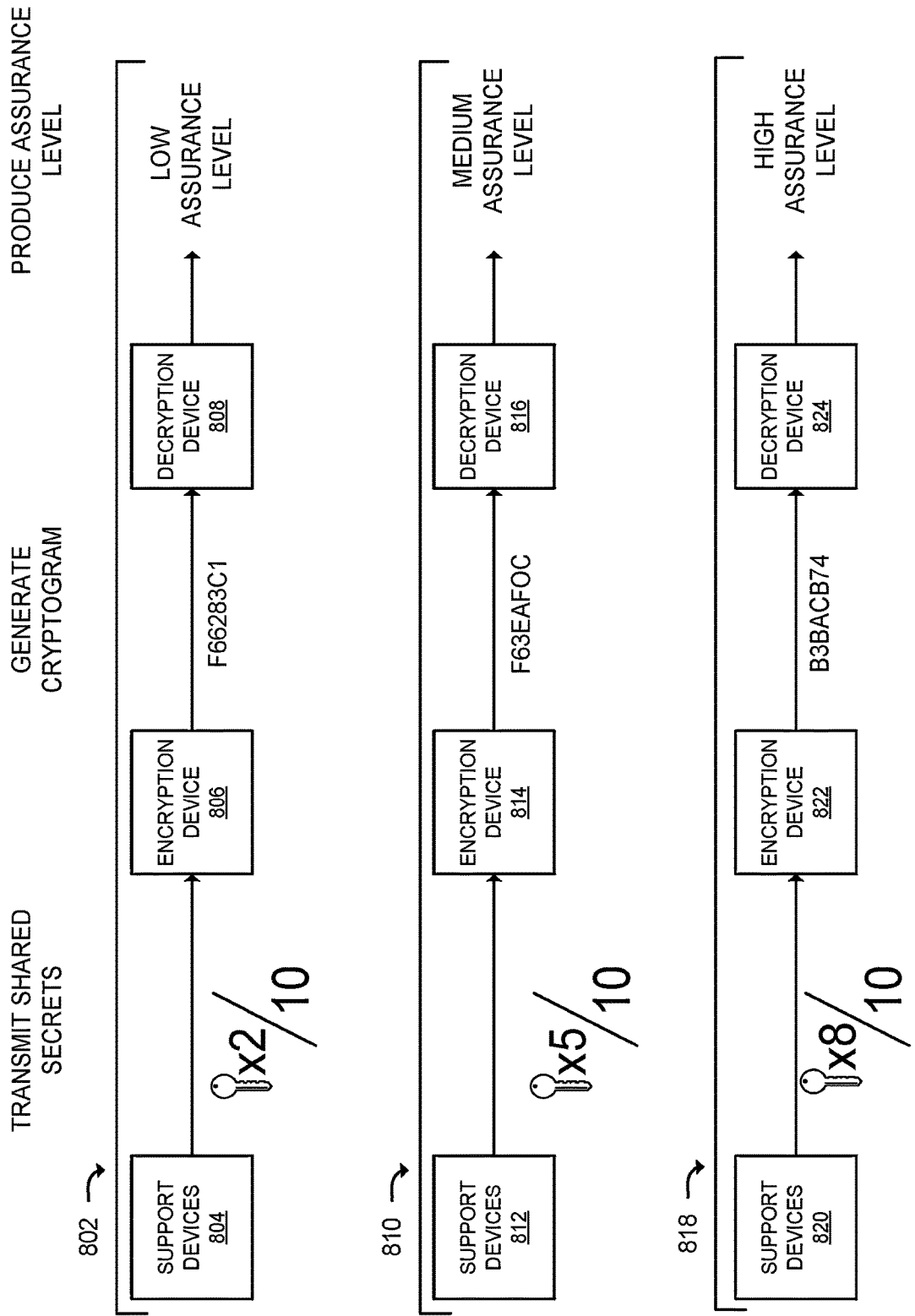
FIG. 8 shows a block diagram detailing authentication cryptogram generation at three different assurance levels according to some embodiments.

FIG. 8 shows a block diagram with three groups, each group corresponding to a different assurance level. Group 802 corresponds to a low assurance level, group 810 corresponds to a medium assurance level, and group 818 corresponds to a high assurance level.

Group 802 shows a collection of support devices 804, an encryption device 806, and a decryption device 808. The diagram shows the support devices 804 transmitting two secret shares or derived values (indicated by the key symbol), out of a total of ten secret shares to the encryption device 806. The encryption device 806 generates an authentication cryptogram and transmits it to the decryption device 808. The decryption device 808 decrypts the authentication cryptogram and determines the assurance level, in this case a low assurance level.

Group 810 shows a collection of support devices 812, an encryption device 814, and a decryption device 816. The diagram shows the support devices 812 transmitting five secret shares or derived values out of a total of ten to the encryption device 814. The encryption device 814 generates an authentication cryptogram and transmits it to the decryption device 816. The decryption device 816 decrypts the authentication cryptogram and determines the assurance level, in this case a medium assurance level.

Group 818 shows a collection of support devices 820, an encryption device 822, and a decryption device 824. The diagram shows the support devices 820 transmitting eight secret shares or derived values out of a total of ten to the encryption device 822. The encryption device 822 generates an authentication cryptogram and transmits it to the decryption device 824. The decryption device 824 decrypts the authentication cryptogram and determines the assurance level, in this case a high assurance level.

Although the examples above discussed three assurance levels, low, medium, and high, embodiments may provide for any number of assurance levels.

The following section discusses a process that a decryption device can use in order to decrypt an authentication cryptogram, evaluate its contents and authenticate an encryption device.

VII. Authentication by Decryption Device

Once an authentication cryptogram has been generated, the authentication cryptogram can be transmitted to a decryption system. The decryption system can decrypt the cryptogram and evaluate the encrypted data. Based on this evaluation, the decryption system can authenticate the encryption device. Methods performed by the decryption system may be better understood with reference to FIG. 9.

Figure 9:
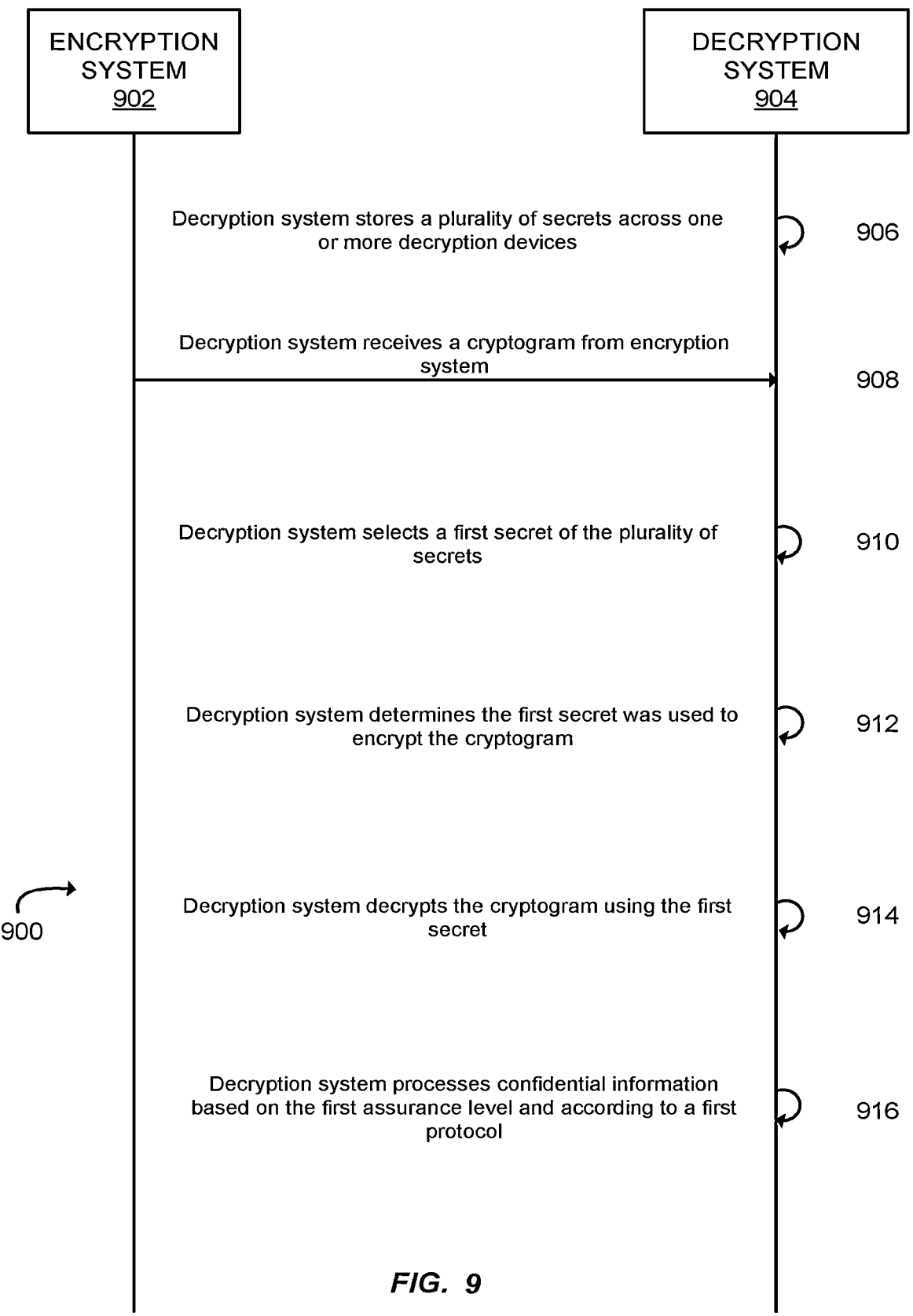
FIG. 9 shows a method of authenticating an encryption system performed by an encryption system and a decryption system according to some embodiments.

FIG. 9 shows a method 900, performed by a decryption system 904 for decrypting an authentication cryptogram and processing confidential information. The cryptogram can be a cryptogram generated by an encryption device, such as the cryptogram generated in step 420 of FIG. 4 or step 520 of FIG. 5.

At step 906, a decryption system 904 stores a plurality of secrets across one or more decryption devices. The decryption system 904 may include a single decryption device or multiple decryption devices. Alternatively, the decryption system 904 may include a single decryption device and a collection of support devices. These secrets may be "shared secrets" and may have corresponding secret shares. Additionally, the secrets may be associated with a particular encryption device or encryption system. For example, an encryption system may have three secrets corresponding to low, medium, and high assurance levels and may have a number of secret shares corresponding to these secrets. The decryption system 904 may possess the same set of secrets, enabling consistency in encrypting and decrypting cryptograms. M out of N secret sharing does not require that the same combination of M secret shares used to encrypt the cryptogram are needed to decrypt the cryptogram. Thus the decryption system may decrypt using a different combination of M secret shares, partial cryptographic values, or values derived from partial cryptographic values. The secrets associated with the encryption system 902 may have been previously received from the decryption network 904 via a secure channel, for example, if the decryption network 904 was the trusted external server 302 from FIG. 3.

The secrets stored at the decryption system 904 may be associated with different assurance levels. For example, a first secret may correspond to a high assurance level and a second secret may correspond to a low assurance level. The first assurance level may be higher than the second assurance level. Further, these secrets and their corresponding assurance level may additionally correspond to a number of secret shares. For example, a secret corresponding to a high assurance level may require more secret shares to generate than a secret corresponding to a low assurance level.

At step 908, the decryption system 904 receives an authentication cryptogram (also referred to as "cryptogram") from an encryption system 902. The encryption system 902 may include an encryption device and one or more support devices. The encryption system 902 may be similar to the collection of user devices 102 in FIG. 1. This cryptogram may have been generated using methods described above, and may be substantially similar to the cryptogram generated at step 420 of FIG. 4 or 520 of FIG. 5.

At step 910, the decryption system 904 selects a first secret of the plurality of secrets. This may involve retrieving one or more secret shares from secure memory from one or more decryption devices and generating the first secret using those secret shares. The first secret may be used to generate a cryptographic key that may be used to decrypt the cryptogram. The first secret may also correspond to a first assurance level.

At step 912, the decryption system 904 may determine that the first secret was used to encrypt the cryptogram. In some embodiments, a claimed assurance level is associated with the cryptogram. The decryption system can interpret the claimed assurance level (e.g., "high assurance") and determine that a first secret corresponding to the claimed assurance level was used to encrypt the cryptogram. Alternatively, when a claimed assurance level is not associated with the cryptogram, determining that the first secret was used to encrypt the cryptogram may involve attempting to decrypt the cryptogram using a cryptographic key generated from the first secret. If the decryption operation is successful, then the first secret was used to encrypt the cryptogram. Success of the decryption operation can be verified in a number of ways. For example, before data is encrypted to generate the cryptogram, the data could be "padded" with a particular sequence of characters or values, e.g., "00000000" or "SUCCESS." Because it is extremely unlikely that these sequences would appear randomly, it follows that the decryption operation was successful.

Otherwise, if the decryption operation is unsuccessful, the first secret was not used to encrypt the cryptogram. This may be verified in a similar manner as above. The decrypted cryptogram may have a well-defined form and if the decrypted cryptogram deviates from this well-defined form, it indicates that the cryptogram was not decrypted successfully. For example, if all decrypted cryptograms lead with "00000000," a decrypted cryptogram that does not lead with this sequence was not decrypted correctly. In this case, the decryption system 904 may attempt to decrypt the cryptogram using a cryptographic key derived from a second secret, such as a cryptographic key corresponding to a different assurance level. The decryption system 904 can repeatedly try each cryptographic key corresponding to each secret it possesses until it successfully decrypts the cryptogram or runs out of secrets.

Alternatively, the decryption system 904 may have received a stated assurance level associated with the cryptogram, such as "high assurance." This assurance level may be transmitted as a string, e.g., a message stating "high assurance" or "low assurance." It may also be transmitted as a code. For example, the encryption system 902 could append eight bits to the front of the cryptogram. These eight bits could correspond to different assurance levels. As an example, "00000001" could correspond to a very low assurance level and "11111111" could correspond to an extremely high assurance level. The decryption system 904 may analyze these bits to determine the stated assurance level then remove them from the cryptogram. The decryption system 904 may further generate a cryptographic key using the secret corresponding to the stated assurance level and attempt to decrypt the cryptogram using that cryptographic key. If the cryptogram decrypts successfully, the cryptogram's actual assurance level matches the stated assurance level. As an example, an assurance level corresponding to a first secret may be "10001000." The decryption system 904 may interpret this assurance level, decrypt the cryptogram and verify that the stated assurance level is identical to the assurance level corresponding to the first secret. If this is the case, the first secret was used to encrypt the cryptogram.

At step 914, the decryption system 904 may decrypt the cryptogram using the first secret. This may involve using the first secret as a cryptographic key, or using the first secret to generate a cryptographic key using a key generation algorithm. The decrypted cryptogram may contain confidential information. The confidential information may include a comparison assurance level and user information. The comparison assurance level may be used as a check or verification on the assurance level of the cryptogram. The user information may include information that uniquely identifies the user, such as a passcode, biometric, phone number, account number, etc. The user information may be encrypted user information.

At step 916, the decryption system 904 may process the confidential information according to a first protocol. The first protocol may be an authentication protocol that authenticates the encryption system 902 or an encryption device in the encryption system 902. For example, the confidential information could constitute a password, and processing the confidential information could involve verifying that the password matches a stored password. Alternatively, the confidential information could be a payment account number along with transaction details. In this case, processing the confidential information could involve enacting a transaction using the payment account number. As another example, if the decryption system 904 is a web-based email server, processing the confidential information could involve determining an email account associated with that confidential information.

The first protocol may involve comparing the assurance level encrypted in the authentication cryptogram against a threshold assurance level. For example, the first protocol may only allow encryption devices to be authenticated if the assurance level is a "medium" assurance level or higher. If the assurance level is lower, the decryption system 904 may stop processing the confidential information, or return an error code or error message to the encryption system 902. The first protocol may also involve comparing the user information against user information in a database. If the user information matches an entry in the database, and the assurance level exceeds a threshold assurance level, the decryption system 904 may authenticate the encryption system 902 or an encryption device.

The consequences of authentication can depend on the nature of the decryption system 904. For example, if the decryption system 904 is a web-based email server, authentication can result in the encryption device being able to access emails on that email server. If the decryption system 904 is a payment processing network, authentication could result in the completion of a transaction or payment. If the decryption system 904 is a building access terminal, authentication could result in a door being briefly unlocked. In general, authentication may result in an action or event that is otherwise risky, and there are numerous other examples of decryption systems and corresponding events that may occur in conjunction with authentication.

VIII. Additional Configurations

Figure 10:
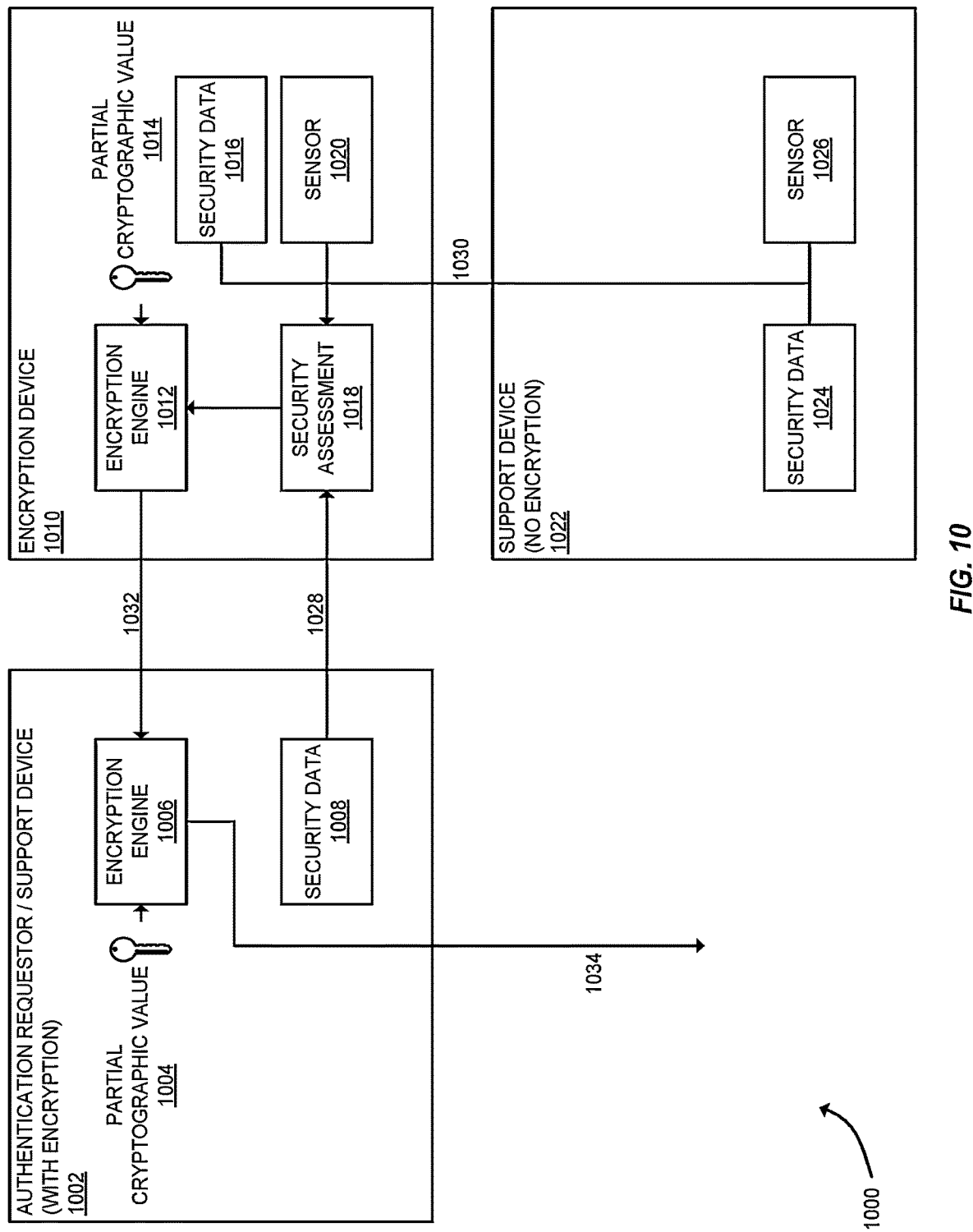
FIG. 10 shows a block diagram of an authentication request, an encryption device, and a support device according to some embodiments.

Embodiments provide for various configurations of support devices and encryption devices, and various methods corresponding to those configurations. FIG. 10, for example, shows a block diagram of support devices and an encryption device, and may be used to better understand embodiments. In general, FIG. 10 shows an encryption device 1010 receiving security data from support devices 1002 and 1022, performing a security assessment 1018 and generating a cryptogram using an encryption engine 1012. The cryptogram is transferred to support device 1002 that generates a second cryptogram using its own encryption engine 1006 and partial cryptographic value 1004.

The authentication requestor/support device 1002 is capable of performing cryptographic functions, such as cryptographic multi-party computation and encryption. The authentication requestor/support device 1002 possesses a partial cryptographic value 1004, an encryption engine 1006, and security data 1008.

The authentication requestor requests a cryptogram for the purpose of authentication. In an exemplary use case, the authentication requestor may be a user device such as a laptop, and may be used as part of a transaction, such as an e-commerce transaction. In this use case, the authentication requestor may request a transaction cryptogram that can be decrypted and analyzed by a decryption system (e.g., a payment processing network) as part of approving the transaction.

The encryption engine 1006 may be code, instructions or a program on a computer readable medium. The encryption engine may also be a specialized piece of hardware configured to perform encryption functions as part of generating a cryptogram. Even though the authentication requestor/support device 1002 is a support device, it may perform some encryption as part of generating the cryptogram. The encryption engine 1006 may use the partial cryptographic value 1004 as part of generating the cryptogram. The partial cryptographic value may include one or more secret shares, the one or more secret shares in encrypted form, one or more partial computations derived from the one or more secret shares or a combination thereof.

The security data 1008 may be a database or other repository of data stored on, or accessible to the support device 1002. Additionally, some security data 1008 may be generated by the support device 1002 during or before the authentication/cryptogram generation request. Some security data 1008 may be received from an outside source, such as a proxy device, hub device, or an external security auditor.

The encryption device 1010 may include an encryption engine 1012, a secret share or partial cryptographic value 1014, security data 1016, a component or code for performing a security assessment 1018, and a sensor 1020. The encryption engine 1012 may be substantially similar to the encryption engine 1006. The security data 1016 may include distinct security data, but may include similar security concepts or properties (see Section V). Further, while the partial cryptographic value 1014 is not identical to partial cryptographic value 1004, the partial cryptographic values may have both been derived from the same shared secret.

The security assessment component 1018 may include code, instructions, or specialized hardware for performing a security assessment, as described above in Section V. The encryption device 1010 may receive security data from the authentication requestor/support device 1002, the support device 1022, itself (via its security data 1016), and via the sensor 1020. The sensor 1020 may provide security data that can be used in the security assessment 1018. For example, the encryption device 1010 may be a smart phone with a biometric sensor 1020. A user may be prompted to enter a biometric, such as a fingerprint via the biometric sensor 1020. A biometric capture of the fingerprint can be compared to a biometric or biometric template stored on or accessible to the encryption device 1010 as part of the security assessment 1018.

The support device 1022 may possess security data 1024 and a sensor 1026. The security data may include distinct security data than security data elements 1008 and 1016. The sensor 1020 may provide security data that can be used in the security assessment 1018. For example, support device may be a smart watch with a pulse sensor 1026. The pulse sensor can provide the security assessment 1018 with security data and properties relating to the user's pulse. The presence of a pulse suggests that the user is present at the time the cryptogram is generated.

The authentication requestor/support device 1002 may generate a request for security assessment and transmit the request to the encryption device 1010. The authentication requestor/support device may pass security data 1008 to the encryption device 1010 in step 1028. The support device 1022 may pass security data including security data 1024 and sensor data from the sensor 1026 to the encryption device 1010. The encryption device 1010 may additionally receive security data from itself, via the security data component 1016 and sensor 1020.

Although the authentication requestor/support device 1002 is shown not performing an individual security assessment, in some embodiments the authentication requestor/support device 1002 can perform its own security assessment. A request for security assessment may be internal, i.e., originating from the authentication requestor/support device 1002 and being received by a security assessment component of the authentication requestor/support device 1002. The request for security assessment may also be transmitted to other support devices and the encryption device, such as encryption device 1010 and support device 1022. Further, each device performing a security assessment may receive security data internally (i.e., from the device itself), as shown by encryption device 1010 receiving security data from security data component 1016.

In addition to security data as described in Section V, the security data may also include information that can be used to identify the source of the security data (i.e., the authentication requestor/support device 1002). The security data may also include information that can be used to authenticate the authentication requestor/support device 1002. For example, the security data can include a number of security properties. These security properties can be used to identify the source of the security data. For example, the security properties can include a device identifier or IP address that can be compared to reference data, such as a whitelist of approved devices on another support device or the encryption device 1010. Additionally, the security properties may additionally include information that can be used to authenticate the authentication requestor/support device, such as a signed digital certificate. A step of comparing the security properties to reference data may include performing any appropriate authentication functions to determine or confirm the identity of any and all devices from which the encryption device 1010, authentication requestor/support device 1002, or any other support device 1022 receives data. Comparing the security properties to reference data may include verifying that devices sending security data have valid certification, such as by verifying a public key certificate using any appropriate certificate validation method.

The encryption device 1010 may perform security assessment 1018 using the collected security data and may decide to participate in the multi-party computation. The encryption device 1010 may transmit its own partial cryptographic value 1014 to the encryption engine 1012. In some embodiments, the partial cryptographic value may be transmitted to an encryption engine on another device, such as the encryption engine 1006, rather than the encryption engine 1012 on the encryption device 1010. Alternatively, the partial cryptographic value may be transmitted to one or more encryption engines, such as both encryption engine 1006 and encryption engine 1012.

The encryption engine 1012 may use the partial cryptographic value 1014 to generate a cryptogram via multi-party computation. The cryptogram may include an assurance level and user information or confidential information that may be processed by a decryption system. The cryptogram may be transmitted to the authentication requestor/support device 1002 in step 1032.

The authentication requestor/support device 1002 may receive the first cryptogram at its encryption engine 1006. The authentication requestor/support device 1002 may use its own partial cryptographic value and the first cryptogram to generate a second cryptogram. At step 1034, the authentication requestor/support device 1002 may transmit the generated cryptogram as part of an authentication request, for example, to a decryption system that can decrypt the cryptogram, determine an assurance level, and process confidential information in the cryptogram. The cryptogram may be transmitted along with a claim associated with the cryptogram, such as a claimed or stated assurance level, risk factors, or trust scores associated with the claim.

Notably, some support devices (e.g., support device 1022) may possess no components enabling them to perform cryptographic operations, contribute secret shares, or generate cryptograms. These support devices can still participate in security assessment by providing security data to encryption devices and other support devices. Likewise, support devices may still perform encryption or cryptogram generation functions, such as generating a new cryptogram based on the support device's partial cryptographic value and a received cryptogram. In some embodiments, support devices may each in turn receive a cryptogram, contribute their own partial cryptographic value to the cryptogram, and provide the resulting cryptogram to the next support device, eventually building a cryptogram that can be sent by an authentication requestor to a decryption system.

IX. Computer System

Figure 11:
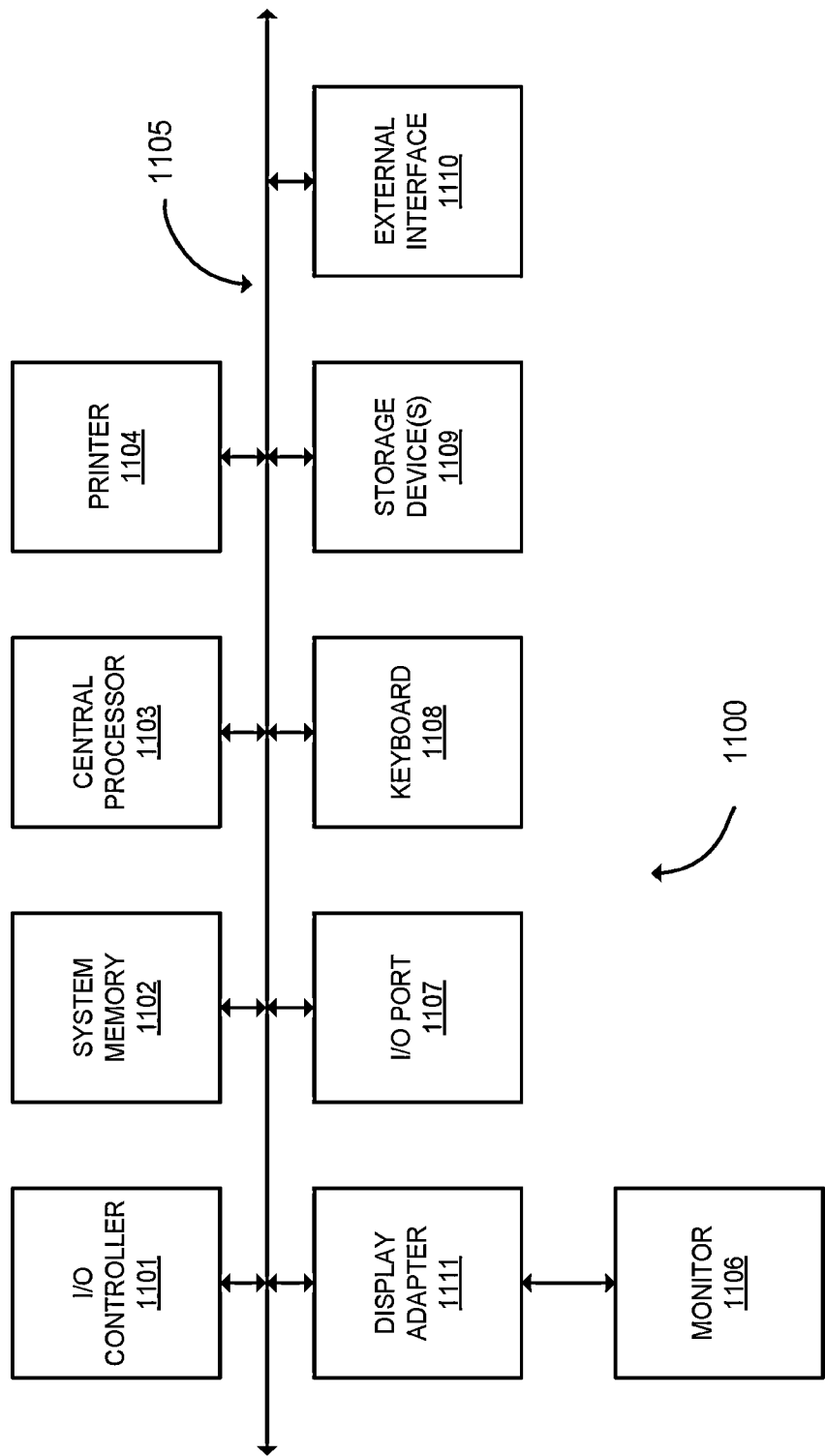
FIG. 11 shows a computer system according to some embodiments.

Any of the computer systems mentioned herein may utilize any suitable number of subsystems. Examples of such subsystems are shown in FIG. 11 in computer apparatus 1100. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 11 are interconnected via a system bus 1105. Additional subsystems such as a printer 1104, keyboard 1108, storage device(s) 1109, monitor 1106, which is coupled to display adapter 1111, and others are shown. Peripherals and input/output (I/O) devices which couple to I/O controller 1001, can be connected to the computer system by any number of means known in the art such as input/output (I/O) port 1007 (e.g., USB, FireWire®). For example, I/O port 1007 or external interface 1010 (e.g. Ethernet, Wi-Fi, etc.) can be used to connect computer system 1000 to a wide area network such as the Internet, a mouse input device, or a scanner. The interconnection via system bus 1005 allows the central processor 1003 to communicate with each subsystem and to control the execution of instructions from system memory 1102 or the storage device(s) 1009 (e.g., a fixed disk, such as a hard drive or optical disk), as well as the exchange of information between subsystems. The system memory 1102 and/or the storage device(s) 1009 may embody a computer readable medium. Any of the data mentioned herein can be output from one component to another component and can be output to the user.

A computer system can include a plurality of the same components or subsystems, e.g., connected together by external interface 1110 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the described embodiments can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement the described embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including internet protocols. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects. The above description of exemplary embodiments has been presented for the purpose of illustration and description. It is not intended to be exhaustive or to limit embodiments to the precise form described, and many modifications and variations are possible in light of the teaching above. The embodiments were chosen and described in order to best explain the principles of embodiments and their practical applications to thereby enable others skilled in the art to best utilize various embodiments and various modifications to those embodiments as suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method for participating in a generation of a cryptogram, the method comprising:
    receiving, by one or more support devices, a request for security assessment, wherein the request is for the one or more support devices to participate in a multi-party computation to generate the cryptogram, and wherein each of the one or more support devices stores one or more secret shares among a plurality of secret shares generated based on a shared secret;

receiving, by the one or more support devices, security data comprising one or more security properties corresponding to a current state of a device providing the security data;

based on the one or more security properties, determining, by the one or more support devices, whether to participate in the multi-party computation, the determining comprising determining by at least one support device among the one or more support devices to participate; and based on the at least one support device determining to participate, providing, by the at least one support device, at least one partial cryptographic value to an encryption device, wherein the at least one partial cryptographic value is configured to be used by the encryption device to generate the cryptogram via the multi-party computation, and wherein the at least one partial cryptographic value is generated based on one or more secret shares stored by the at least one support device.

2. The method of claim 1, wherein the security data include one or more of a group consisting of:

a location of the encryption device, a user authentication risk estimate, whether a user is present at the encryption device, a purpose for generating the cryptogram, a local time at the encryption device, a local time at the device, and an IP address of the encryption device.

3. The method of claim 1, wherein reference data includes one or more of the following:

one or more previous locations of the encryption device, one or more previous user authentication risk estimate, whether a user was previously present at the encryption device, one or more previous purposes for generating one or more cryptograms, one or more previous times at which the one or more cryptograms were generated, and one or more previous IP addresses of the encryption device.

4. The method of claim 1, wherein the determining whether to participate in the multi-party computation further comprises:

determining a likelihood that the cryptogram is being generated for a fraudulent purpose;

comparing the likelihood to a predetermined assurance level; and determining to participate in the multi-party computation in response to the likelihood being less than the predetermined assurance level.

5. The method of claim 1, further comprising:

transmitting a request for the security data to one or more other support devices; and receiving the security data from the one or more other support devices.

6. The method of claim 1, wherein a number of secret shares included in the partial cryptographic value is inversely proportional to a likelihood that the cryptogram is being generated for a fraudulent purpose.

7. The method of claim 1, wherein the cryptogram comprises one or more of the following: an assurance level and user information.

8. The method of claim 1, wherein the one or more security properties include identification data used by the one or more support devices to identify a source of the security data, and wherein the determining whether to participate in the multi-party computation further comprises identifying, using the identification data, the source of the security data to be a peer in a group of devices comprising the one or more support devices.

9. The method of claim 1, wherein the one or more security properties include one or more signed digital certificates, and wherein the determining whether to participate in the multi-party computation further comprises authenticating one or more sources of the security data by verifying the signed digital certificates.

10. The method of claim 1, wherein the determining whether to participate in the multi-party computation further comprises:

determining a likelihood that the cryptogram is being generated for a fraudulent purpose;

comparing the likelihood to a predetermined assurance level; and determining to participate in the multi-party computation in response to the likelihood being equal to or more than the predetermined assurance level.

11. A method for generating a cryptogram, the method being performed by an encryption device and comprising:

transmitting a request for a security assessment to one or more support devices, wherein the request is for the one or more support devices to participate in a multi-party computation to generate the cryptogram, wherein the one or more support devices store one or more secret shares among a plurality of secret shares generated based on a shared secret;

transmitting security data to the one or more support devices;

receiving at least one partial cryptographic value from at least one support device of the one or more support devices, wherein the at least one partial cryptographic value is generated based on one or more secret shares stored by the at least one support device; and generating the cryptogram using the at least one partial cryptographic value and a partial cryptographic value of the encryption device.

12. The method of claim 11, wherein the security data include one or more of the following: location of the encryption device, a user authentication risk estimate, whether a user is present at the encryption device, a purpose for generating the cryptogram, a local time at the encryption device, a local time at the one or more support devices, and an IP address of the encryption device.

13. The method of claim 11, further comprising transmitting the cryptogram to a decryption device, the decryption device decrypting the cryptogram in order to produce an assurance level, wherein the assurance level is proportional to a likelihood that the cryptogram was generated for a fraudulent purpose.

14. The method of claim 11, wherein the cryptogram comprises one or more of the following: an encrypted assurance level and encrypted user information.

15. A method of decrypting a cryptogram, the method being performed by a decryption system and comprising:

storing a plurality of secrets on one or more decryption devices of the decryption system, wherein the plurality of secrets are also stored by an encryption system, wherein each of the plurality of secrets is stored by the decryption system in association with a different assurance level, wherein encryption devices of the encryption system contribute more secret shares to generate a first secret for a first assurance level than to generate a second secret for a second assurance level lower than the first assurance level, among the plurality of secrets;

receiving the cryptogram from the encryption system;

selecting a secret corresponding to a particular assurance level, among the plurality of secrets, to decrypt the cryptogram; decrypting the cryptogram using the secret to obtain information; and processing the information based on a protocol corresponding to the particular assurance level.

16. The method of claim 15, wherein:

the selecting the secret comprises selecting the first secret;

the decrypting comprises decrypting the cryptogram using the first secret to obtain confidential information; and the processing comprises processing the confidential information based on a first protocol.

17. The method of claim 16, further comprising receiving the particular assurance level from the encryption system; and determining that the first secret was used to encrypt the cryptogram by comparing the particular assurance level to the first assurance level, and determining that the particular assurance level matches the first assurance level based on the comparing.

18. The method of claim 16, wherein the confidential information comprises a comparison assurance level and user information; and wherein the processing the confidential information according to the first protocol comprises comparing the comparison assurance level to a predetermined threshold assurance level, and comparing the user information against a user record.

19. The method of claim 16, further comprising:

authenticating one of the encryption devices of the encryption system based on the confidential information and the first protocol.

* * * * *